United States Patent
Wang

(10) Patent No.: US 12,445,823 B2
(45) Date of Patent: Oct. 14, 2025

(54) METHOD FOR INVOKING NFC APPLICATION, ELECTRONIC DEVICE, AND NFC APPARATUS

(71) Applicant: Huawei Technologies Co., Ltd., Shenzhen (CN)

(72) Inventor: Zaishang Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 368 days.

(21) Appl. No.: 17/909,132

(22) PCT Filed: Mar. 1, 2021

(86) PCT No.: PCT/CN2021/078545
§ 371 (c)(1),
(2) Date: Sep. 2, 2022

(87) PCT Pub. No.: WO2021/175198
PCT Pub. Date: Sep. 10, 2021

(65) Prior Publication Data
US 2023/0098616 A1      Mar. 30, 2023

(30) Foreign Application Priority Data

Mar. 4, 2020   (CN) .......................... 202010143986.3

(51) Int. Cl.
*H04B 5/20*   (2024.01)
*H04W 4/80*   (2018.01)
*H04B 5/70*   (2024.01)

(52) U.S. Cl.
CPC ................ *H04W 4/80* (2018.02); *H04B 5/20* (2024.01); *H04B 5/70* (2024.01)

(58) Field of Classification Search
CPC ... H04B 5/72; H04B 5/70; H04W 4/80; G06F 9/445; H04M 2250/04
(Continued)

(56) References Cited

U.S. PATENT DOCUMENTS 9,894,469 B2 *  2/2018  Van Nieuwenhuyze ...................
                                                                  H04W 12/02
10,219,135 B1   2/2019  Yau
                        (Continued)

FOREIGN PATENT DOCUMENTS

CN          104463254 A      3/2015
CN          104881805 A      9/2015
                 (Continued)

*Primary Examiner* — Eugene Yun
(74) *Attorney, Agent, or Firm* — Slater Matsil, LLP

(57) ABSTRACT

This application provides a method for invoking a near field communication NFC application, an electronic device, and an NFC apparatus, and relates to electronic device technologies in the artificial intelligence (AI) field. Specifically, the electronic device may learn a rule of using NFC applications by the user, so that when the electronic device approaches an NFC device, the electronic device intelligently predicts a use requirement of the user for the NFC applications based on context awareness in combination with one or more of geographical location information, time information, weather information, motion information, or usage information of the electronic device. In this way, an NFC application group that can meet the user requirement and that is corresponding to a use order is invoked, so that the electronic device automatically verifies, one by one, the NFC devices that are approached by the electronic device.

20 Claims, 16 Drawing Sheets

(58) Field of Classification Search
USPC ........................................................ 455/41.1
See application file for complete search history.

(56) References Cited

U.S. PATENT DOCUMENTS

| | | |
|---|---|---|
| 2014/0058860 A1 | 2/2014 | Roh et al. |
| 2014/0139323 A1* | 5/2014 | Choo ..................... H04W 4/80 |
| | | 235/492 |
| 2016/0302025 A1 | 10/2016 | Bell et al. |

FOREIGN PATENT DOCUMENTS

| | | |
|---|---|---|
| CN | 105491243 A | 4/2016 |
| CN | 105721670 A | 6/2016 |
| CN | 108205637 A | 6/2018 |
| CN | 109257071 A | 1/2019 |
| CN | 109547987 A | 3/2019 |
| CN | 109919600 A | 6/2019 |
| CN | 110035180 A | 7/2019 |
| CN | 110381443 A | 10/2019 |
| CN | 110673896 A | 1/2020 |
| CN | 110795949 A | 2/2020 |
| CN | 110807502 A | 2/2020 |
| WO | 2019127441 A1 | 7/2019 |

\* cited by examiner

METHOD FOR INVOKING NFC APPLICATION, ELECTRONIC DEVICE, AND NFC APPARATUS

CROSS-REFERENCE TO RELATED APPLICATIONS

This application is a national stage of International Application No. PCT/CN2021/078545, filed on Mar. 1, 2021, which claims priority to Chinese Patent Application No. 202010143986.3, filed on Mar. 4, 2020. Both of the aforementioned applications are hereby incorporated by reference in their entireties.

TECHNICAL FIELD

E Embodiments of this application relate to electronic device technologies in the artificial intelligence AI field, and in particular, to a method for invoking an NFC application, an electronic device, and an NFC apparatus.

BACKGROUND

As a short-distance high-frequency wireless communication technology, an NFC technology (also referred to as a short-distance wireless communication technology) may allow non-contact device identification and data transmission between devices.

With the development of intelligent devices, more electronic devices support a function of an NFC analog card application (referred to as an NFC application for short below). For example, the NFC application may include a transportation card application, an access control card application, a payment card application, or an identity card application. A user may complete payment, travel, identity verification, or the like by using an electronic device with an NFC function, without carrying different physical cards (for example, an identity card, a bank card, or a bus card) with the user.

If a conventional electronic device needs to invoke an NFC application, a user needs to manually select, based on an actual usage scenario, an NFC application that the user wants to use. For example, when the user takes a bus, the user needs to find a transportation card application from a plurality of NFC applications, and then the electronic device may perform an NFC card swiping behavior on the bus by using the transportation card application. The method has complex operations, and low user experience.

SUMMARY

This application provides a method for invoking an NFC application, an electronic device, and an NFC apparatus, to resolve problems of complex operations and low user experience that are caused because a user needs to manually select a to-be-used NFC application.

To achieve the foregoing objectives, the following technical solutions are used in embodiments of this application.

According to a first aspect, a method for invoking an NFC application is provided. The method is applied to an electronic device, and the electronic device includes a plurality of NFC applications. The method may include: The electronic device obtains current scenario information that is of the electronic device and that includes one or more of geographical location information, time information, weather information, motion information, or usage information, where the motion information is used to indicate a motion status of the electronic device, and the usage information is used to indicate information about the electronic device using NFC applications within a preset time range prior to a time indicated by the time information. The electronic device determines a first NFC application group and a use order corresponding to the first NFC application group based on the current scenario information, where the first NFC application group includes n NFC applications, n≥2, and n is a positive integer. The electronic device sequentially activates and invokes the NFC applications in the first NFC application group based on the use order corresponding to the first NFC application group.

According to the technical solution provided in the first aspect, when the electronic device approaches an NFC device, the electronic device intelligently predicts a use requirement of a user for the NFC applications based on context awareness in combination with one or more of the geographical location information, the time information, the weather information, the motion information, or the usage information of the electronic device. In this way, the NFC application group that can meet the user requirement and that is corresponding to the use order is invoked, so that the electronic device automatically verifies, one by one, the NFC devices that are approached by the electronic device, thereby providing more convenient use experience for the user.

In a possible implementation, that the electronic device sequentially activates and invokes the NFC applications in the first NFC application group based on the use order corresponding to the first NFC application group includes: The electronic device activates an $i^{th}$ NFC application in the first NFC application group, where i is a positive integer, and i<n. The electronic device verifies the $i^{th}$ NFC application when approaching an NFC device. The electronic device activates an $(i+1)^{th}$ NFC application after the verification of the $i^{th}$ NFC application succeeds. The NFC applications in the first NFC application group predicted by the electronic device are activated and invoked one by one, so that the requirement of the user for continuously using the plurality of NFC applications in a same scenario can be automatically met, thereby providing more convenient use experience for the user.

In a possible implementation, the $i^{th}$ NFC application is an $i^{th}$ invoked NFC application in the first NFC application group in a usage scenario corresponding to usage scenario information of the first NFC application group, and the $(i+1)^{th}$ NFC application is an $(i+1)^{th}$ invoked NFC application in the first NFC application group in the usage scenario corresponding to the usage scenario information of the first NFC application group. The usage scenario information matches the current scenario information, and the usage scenario information includes one or more of geographical location information, time information, weather information, motion information, and operation information of the electronic device when the first group of NFC applications are invoked. The electronic device may specifically obtain a time order, a priority order, a spatial order, or the like in the use requirement of the user for the NFC applications through prediction based on context awareness, so that the requirement of the user for continuously using the plurality of NFC applications in the same scenario is automatically met, thereby providing more convenient use experience for the user.

In a possible implementation, before the electronic device sequentially activates and invokes the NFC applications in the first NFC application group based on the use order corresponding to the first NFC application group, the method may further include: The electronic device displays a first interface used by the user to determine whether to use the first NFC application group. The electronic device receives an operation of determining, by the user on the first interface, to use the first NFC application group. That the electronic device sequentially activates and invokes the NFC applications in the first NFC application group based on the use order corresponding to the first NFC application group may specifically include: In response to the operation of determining, by the user on the first interface, to use the first NFC application group, the electronic device sequentially activates and invokes the NFC applications in the first NFC application group based on the use order corresponding to the first NFC application group. After obtaining the NFC application group through prediction, the electronic device can query the user whether to use the NFC applications. Such reminding and query can avoid a problem that the verification of the electronic device cannot succeed due to incorrect prediction of the electronic device.

In a possible implementation, the first interface is further used to remind the user of the use order of the n NFC applications in the first NFC application group. After obtaining the NFC application group through prediction, the electronic device can further remind the user of the use order of the plurality of NCFs in the NFC application group. Such reminding can avoid the problem that the verification of the electronic device cannot succeed due to the incorrect prediction of the electronic device.

In a possible implementation, the electronic device pre-stores a plurality of NFC application groups, and each NFC application group includes a plurality of NFC applications. That the electronic device determines the first NFC application group based on the current scenario information may specifically include: The electronic device determines, based on the current scenario information, the first NFC application group from the plurality of NFC application groups pre-stored in the electronic device, where the first NFC application group is an NFC application group, in the plurality of NFC application groups, whose usage scenario information has the highest matching degree with the current scenario information. The electronic device can pre-store the plurality of NFC application groups obtained through learning, and the electronic device can match, based on the current scenario information, the NFC application group with the usage scenario information. This obtains a better prediction effect.

In a possible implementation, the method may further include: The electronic device obtains, based on usage scenario information about the electronic device using NFC applications within a preset time range, a rule of using the NFC applications by the user; the electronic device determines a plurality of NFC application groups based on the rule of using the NFC applications by the user, and pre-stores the plurality of NFC application groups in the electronic device; and/or the electronic device receives a plurality of user-defined NFC application groups, and pre-stores the plurality of user-defined NFC application groups in the electronic device. The electronic device obtains the plurality of NFC application groups in different usage scenarios based on historical usage information or receiving user-defined, and pre-stores the plurality of NFC application groups in the electronic device, so that in a subsequent use process, the electronic device can predict the use requirement of the user for the NFC applications based on the current scenario information.

In a possible implementation, if the verification of the $i^{th}$ NFC application fails, the method may further include: The electronic device sequentially activates other NFC applications other than the $i^{th}$ NFC application in the first NFC application group until the verification of the NFC applications of the electronic device succeeds. If the prediction of the electronic device is incorrect, the electronic device may successfully verify, by using a method of polling the NFC applications, the NFC device that is approached by the electronic device. This can avoid the problem that the verification fails due to the incorrect prediction of the electronic device.

In a possible implementation, the method may further include: In a process in which the electronic device sequentially activates the other NFC applications other than the $i^{th}$ NFC application in the first NFC application group, the electronic device records usage scenario information when the electronic device uses the NFC applications. The electronic device updates, based on the usage scenario information recorded by the electronic device when the electronic device uses the NFC applications, the rule of using the NFC applications by the user. The electronic device updates, based on an updated rule of using the NFC applications by the user, an NFC application group that matches the current scenario information. If the prediction of the electronic device is incorrect, the electronic device can further record usage scenario information of the NFC applications in a subsequent process of invoking the NFC applications, and further update the NFC application group corresponding to the usage scenario information. This can provide a better basis and reference for the electronic device to subsequently predict the NFC application group.

In a possible implementation, after the electronic device sequentially activates the other NFC applications other than the $i^{th}$ NFC application in the first NFC application group until the NFC applications are successfully invoked, the method may further include: The electronic device sequentially activates and invokes NFC applications in a second NFC application group based on a use order corresponding to the second NFC application group, where the second NFC application group is an NFC application group, other than the first NFC application group, whose usage scenario information has the highest matching degree with the current scenario information in the plurality of NFC application groups; or the electronic device displays a second interface, where the second interface is used by the user to select a to-be-switched NFC application group. In response to an operation of selecting a third NFC application group by the user, the electronic device sequentially activates and invokes NFC applications in the third NFC application group based on a use order corresponding to the third NFC application group. If the prediction of the electronic device is incorrect, the electronic device can further switch a currently invoked NFC application group or switch to an NFC application group selected by the user. This avoids the problem that the verification fails due to the incorrect prediction of the electronic device.

In a possible implementation, the use order corresponding to the first NFC application group includes a priority order, a geographical order, or a use time order of the n NFC applications in the first NFC application group.

According to a second aspect, an electronic device is provided. The electronic device includes a plurality of NFC applications. The electronic device may include: an information obtaining unit, configured to obtain current scenario information that is of the electronic device and that includes one or more of geographical location information, time information, weather information, motion information, or usage information, where the motion information is used to indicate a motion status of the electronic device, and the usage information is used to indicate information about the electronic device using NFC applications within a preset time range prior to a time indicated by the time information; a processing unit, configured to determine a first NFC application group and a use order corresponding to the first NFC application group based on the current scenario information, where the first NFC application group includes n NFC applications, n≥2, and n is a positive integer; and an NFC invoking unit, configured to sequentially activate and invoke the NFC applications in the first NFC application group based on the use order corresponding to the first NFC application group.

According to the technical solution provided in the second aspect, when the electronic device approaches an NFC device, the electronic device intelligently predicts a use requirement of a user for the NFC applications based on context awareness in combination with one or more of the geographical location information, the time information, the weather information, the motion information, or the usage information of the electronic device. In this way, the NFC application group that can meet the user requirement and that is corresponding to the use order is invoked, so that the electronic device automatically verifies, one by one, the NFC devices that are approached by the electronic device, thereby providing more convenient use experience for the user.

In a possible implementation, that the NFC invoking unit sequentially activates and invokes the NFC applications in the first NFC application group based on the use order corresponding to the first NFC application group includes: The NFC invoking unit activates an $i^{th}$ NFC application in the first NFC application group, where i is a positive integer, and i<n; the NFC invoking unit verifies the $i^{th}$ NFC application when the electronic device approaches an NFC device; and the NFC invoking unit activates an $(i+1)^{th}$ NFC application after the verification of the $i^{th}$ NFC application succeeds. The NFC applications in the first NFC application group predicted by the electronic device are activated and invoked one by one, so that the requirement of the user for continuously using the plurality of NFC applications in a same scenario can be automatically met, thereby providing more convenient use experience for the user.

In a possible implementation, the $i^{th}$ NFC application is an $i^{th}$ invoked NFC application in the first NFC application group in a usage scenario corresponding to usage scenario information of the first NFC application group, and the $(i+1)^{th}$ NFC application is an $(i+1)^{th}$ invoked NFC application in the first NFC application group in the usage scenario corresponding to the usage scenario information of the first NFC application group. The usage scenario information matches the current scenario information, and the usage scenario information includes one or more of geographical location information, time information, weather information, motion information, and operation information of the electronic device when the first group of NFC applications are invoked. The electronic device may specifically obtain a time order, a priority order, a spatial order, or the like in the use requirement of the user for the NFC applications through prediction based on context awareness, so that the requirement of the user for continuously using the plurality of NFC applications in the same scenario is automatically met, thereby providing more convenient use experience for the user.

In a possible implementation, the electronic device further includes a display unit. The display unit is configured to: before the NFC invoking unit sequentially activates and invokes the NFC applications in the first NFC application group based on the use order corresponding to the first NFC application group, display a first interface used by the user to determine whether to use the first NFC application group; and receive an operation of determining, by the user on the first interface, to use the first NFC application group. That the NFC invoking unit sequentially activates and invokes the NFC applications in the first NFC application group based on the use order corresponding to the first NFC application group may specifically include: In response to the operation of determining, by the user on the first interface, to use the first NFC application group, the NFC invoking unit sequentially activates and invokes the NFC applications in the first NFC application group based on the use order corresponding to the first NFC application group. After obtaining the NFC application group through prediction, the electronic device can query the user whether to use the NFC applications. Such reminding and query can avoid a problem that the verification of the electronic device cannot succeed due to incorrect prediction of the electronic device.

In a possible implementation, the first interface is further used to remind the user of the use order of the n NFC applications in the first NFC application group. After obtaining the NFC application group through prediction, the electronic device can further remind the user of the use order of the plurality of NCFs in the NFC application group. Such reminding can avoid the problem that the verification of the electronic device cannot succeed due to the incorrect prediction of the electronic device.

In a possible implementation, the electronic device further includes a storage unit. A plurality of NFC application groups are pre-stored in the storage unit, and each NFC application group includes a plurality of NFC applications. That the NFC invoking unit determines the first NFC application group based on the current scenario information may specifically include: The NFC invoking unit determines, based on the current scenario information, the first NFC application group from the plurality of NFC application groups pre-stored in the electronic device, where the first NFC application group is an NFC application group, in the plurality of NFC application groups, whose usage scenario information has the highest matching degree with the current scenario information. The electronic device can pre-store the plurality of NFC application groups obtained through learning, and the electronic device can match, based on the current scenario information, the NFC application group with the usage scenario information. This obtains a better prediction effect.

In a possible implementation, the processing unit is further configured to: obtain, based on usage scenario information about the electronic device using NFC applications within a preset time range, a rule of using the NFC applications by the user; and determine a plurality of NFC application groups based on the rule of using the NFC applications by the user, and pre-store the plurality of NFC application groups in the electronic device; and/or receive a plurality of user-defined NFC application groups, and pre-store the plurality of user-defined NFC application groups in the storage unit. The electronic device obtains the plurality of NFC application groups in different usage scenarios based on historical usage information or receiving user-defined, and pre-stores the plurality of NFC application groups in the electronic device, so that in a subsequent use process, the electronic device can predict the use requirement of the user for the NFC applications based on the current scenario information.

In a possible implementation, the NFC invoking unit is further configured to: if the verification of the $i^{th}$ NFC application fails, sequentially activate other NFC applications other than the $i^{th}$ NFC application in the first NFC application group until the verification of the NFC applications of the electronic device succeeds. If the prediction of the electronic device is incorrect, the electronic device may successfully verify, by using a method of polling the NFC applications, the NFC device that is approached by the electronic device. This can avoid the problem that the verification fails due to the incorrect prediction of the electronic device.

In a possible implementation, the storage unit is further configured to: in a process in which the NFC invoking unit sequentially activates the other NFC applications other than the $i^{th}$ NFC application in the first NFC application group, record usage scenario information when the electronic device uses the NFC applications. The processing unit is further configured to update, based on the usage scenario information recorded by the electronic device when the electronic device uses the NFC applications, the rule of using the NFC applications by the user; and update, based on the updated rule of using the NFC applications by the user, an NFC application group that matches the current scenario information. If the prediction of the electronic device is incorrect, the electronic device can further record usage scenario information of the NFC applications in a subsequent process of invoking the NFC applications, and further update the NFC application group corresponding to the usage scenario information. This can provide a better basis and reference for the electronic device to subsequently predict the NFC application group.

In a possible implementation, after the NFC invoking unit sequentially activates the other NFC applications other than the $i^{th}$ NFC application in the first NFC application group until the NFC applications are successfully invoked, the NFC invoking unit is further configured to: sequentially activate and invoke NFC applications in a second NFC application group based on a use order corresponding to the second NFC application group, where the second NFC application group is an NFC application group, other than the first NFC application group, whose usage scenario information has the highest matching degree with the current scenario information in the plurality of NFC application groups. Alternatively, the display unit is further configured to display a second interface used by the user to select a to-be-switched NFC application group; and the NFC invoking unit is further configured to: in response to an operation of selecting a third NFC application group by the user, sequentially activate and invoke NFC applications in the third NFC application group based on a use order corresponding to the third NFC application group. If the prediction of the electronic device is incorrect, the electronic device can further switch a currently invoked NFC application group or switch to an NFC application group selected by the user. This avoids the problem that the verification fails due to the incorrect prediction of the electronic device.

In a possible implementation, the use order corresponding to the first NFC application group includes a priority order, a geographical order, or a use time order of the n NFC applications in the first NFC application group.

According to a third aspect, an electronic device is provided. The electronic device includes: a memory, configured to store computer program code, where the computer program code includes instructions; a radio frequency circuit, configured to send and receive a radio signal; and a processor, configured to: execute the instructions, so that the electronic device obtains current scenario information that is of the electronic device and that includes one or more of geographical location information, time information, weather information, motion information, or usage information, where the motion information is used to indicate a motion status of the electronic device, and the usage information is used to indicate information about the electronic device using NFC applications within a preset time range prior to a time indicated by the time information; determine a first NFC application group and a use order corresponding to the first NFC application group based on the current scenario information, where the first NFC application group includes n NFC applications, n≥2, and n is a positive integer; and sequentially activate and invoke the NFC applications in the first NFC application group based on the use order corresponding to the first NFC application group.

According to the technical solution provided in the third aspect, when the electronic device approaches an NFC device, the electronic device intelligently predicts a use requirement of a user for the NFC applications based on context awareness in combination with one or more of the geographical location information, the time information, the weather information, the motion information, or the usage information of the electronic device. In this way, the NFC application group that can meet the user requirement and that is corresponding to the use order is invoked, so that the electronic device automatically verifies, one by one, the NFC devices that are approached by the electronic device, thereby providing more convenient use experience for the user.

In a possible implementation, the processor is further configured to execute the instructions, so that the electronic device performs the method for invoking the NFC application in any possible implementation of the first aspect.

According to a fourth aspect, a computer-readable storage medium is provided. The computer-readable storage medium stores computer-executable instructions, and when the computer-executable instructions are executed by a processor, the method for invoking the NFC application in any possible implementation of the first aspect is implemented.

According to a fifth aspect, a chip system is provided. The chip system includes a processor and a memory, the memory stores instructions, and when the instructions are executed by the processor, the method for invoking the NFC application in any possible implementation of the first aspect is implemented. The chip system may include a chip, or may include a chip and another discrete component.

According to a sixth aspect, a computer program product is provided. When the computer program product is run on a computer, the method for invoking the NFC application in any possible implementation of the first aspect is implemented.

DETAILED DESCRIPTION OF ILLUSTRATIVE EMBODIMENTS

It may be understood that an NFC function generally includes three use modes: a card mode, a card reader mode, and a point-to-point (point-to-point, P2P) mode. The card mode means that an electronic device is used as a non-contact simulation card. The card mode may be applied to a process such as payment, access control verification, or identity verification. The card reader mode means that an electronic device with an NFC function is used as a non-contact card reader. The card reader mode may be applied to a simple data obtaining process. For example, the card reader mode may be applied to a process of obtaining bus station information, obtaining park map information, reading an electronic advertisement, or selling a ticket or a movie ticket. The P2P mode is used to establish a wireless interconnection between two devices that support the NFC function, to perform point-to-point data interaction. For example, the P2P mode may be applied to a process of exchanging a mobile phone contact card, or establishing a Bluetooth connection.

Embodiments of this application provide a method for invoking an NFC application. The method may be applied to a process of implementing payment, access control verification, identity verification, or the like in a card mode by using the NFC function of an electronic device.

The payment may include but is not limited to bus card swiping payment, subway card swiping payment, shopping payment, or the like. The access control verification may include but is not limited to residential community access control verification, residential building access control verification, house key verification, vehicle key verification, or the like. The identity verification may include but is not limited to passenger identity verification, boarding identity verification, company attendance verification, scenic spot identity verification, or the like. In this application, in different scenarios, an electronic device supporting the NFC function may play, as different NFC applications, a same function as a physical bus card, a physical key, a physical bank card, a physical identity card, a physical access control card, or the like.

Figure 1A:
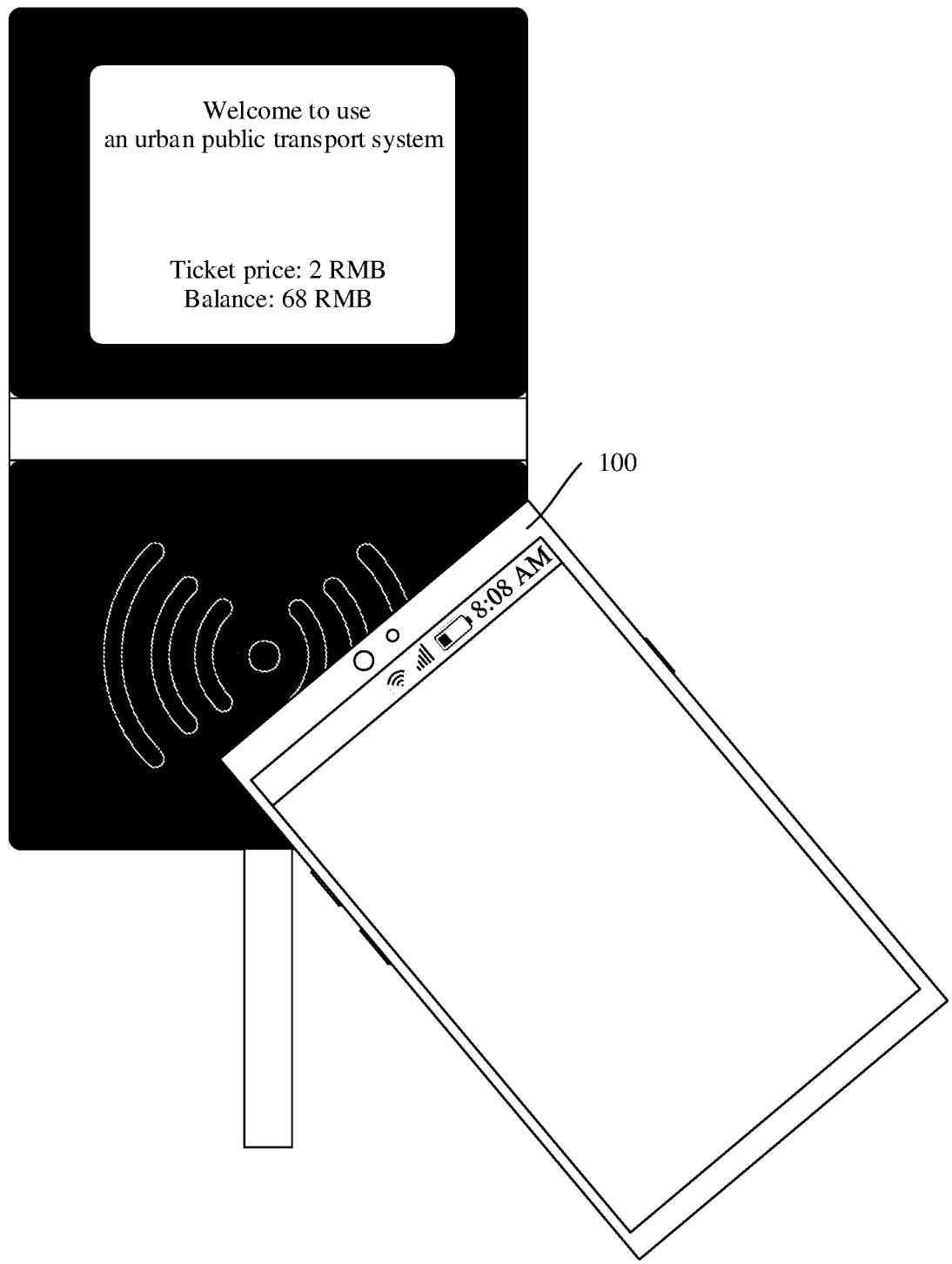
FIG. 1(a) and FIG. 1(b) are a schematic diagram of examples of invoking an NFC application in two payment processes according to an embodiment of this application.
Figure 1B:
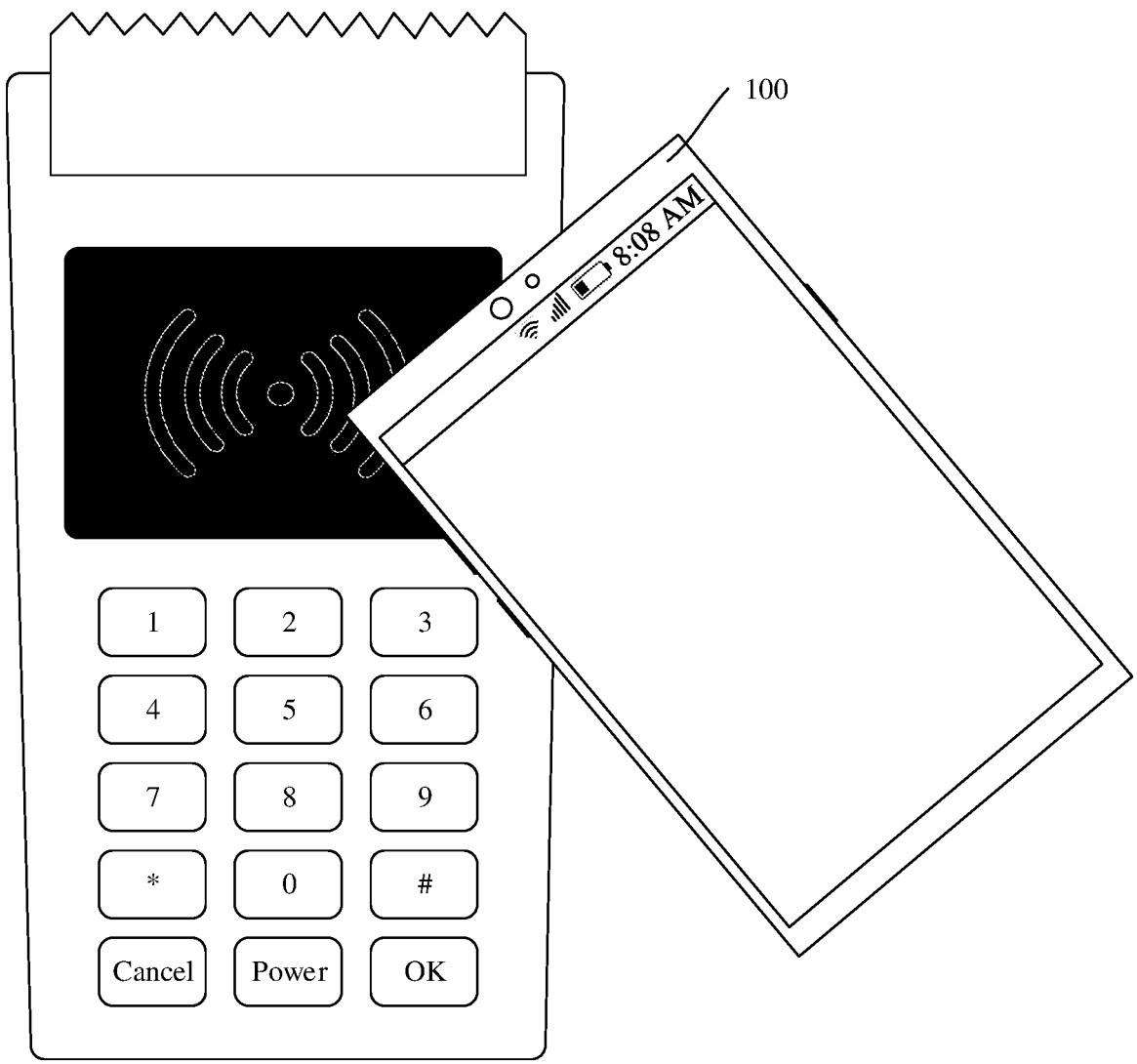

FIG. 1(a) and FIG. 1(b) are a schematic diagram of examples of invoking an NFC application in two payment processes. FIG. 1(a) shows an example of invoking an NFC application in a bus card swiping payment process. As shown in FIG. 1(a), when a bus card reader supports the NFC function, a user using a mobile phone 100 that supports the NFC simulation card function may approach the bus card reader, to implement bus card swiping payment. In a scenario shown in FIG. 1(a), the mobile phone 100 may be used as an NFC bus card application, to play a same bus payment function as a function of a physical bus card. FIG. 1(b) shows an example of invoking an NFC application in a shopping payment process. As shown in FIG. 1(b), when a POS device of a merchant supports the NFC function, the user using the mobile phone 100 that supports the NFC simulation card function may approach the POS device, to implement shopping payment. In a scenario shown in FIG. 1(b), the mobile phone 100 may be used as an NFC payment card application to play a same shopping payment function as a function of a physical bank card.

For ease of understanding, example descriptions of some concepts related to embodiments of this application are provided for reference. Details are described as follows:

NFC application: The NFC application is an application used to implement near field communication (also referred to as near-field communication), and has an emulation function of emulating a non-contact IC card. Based on different application scenarios, there may be different types of NFC applications, for example, a "transportation card" application (such as a "bus card" application and a "subway card" application), an "access control card" application (such as a "parking card" application and a "key" application), a "payment card" application (such as a "bank card" application and a "wallet" application), and an "identity card" application (such as an "identity card" application, an "attendance card" application, and a "social security card" application).

The method for invoking the NFC application provided in embodiments of this application may be applied to a mobile phone, a tablet computer, or a personal computer (Ultra-mobile Personal Computer, UMPC). Alternatively, the method may be applied to another electronic device having an information transmission function, such as a desktop device, a laptop device, a handheld device, a wearable device, a smart home device, or a vehicle-mounted device. For example, the electronic device may be a netbook, a smartwatch, a smart camera, a personal digital assistant (Personal Digital Assistant, PDA), a portable multimedia player (Portable Multimedia Player, PMP), a dedicated media player, or an AR (augmented reality) device/a VR (virtual reality) device. A specific type, structure, and the like of the electronic device are not limited in embodiments of this application.

Figure 2:
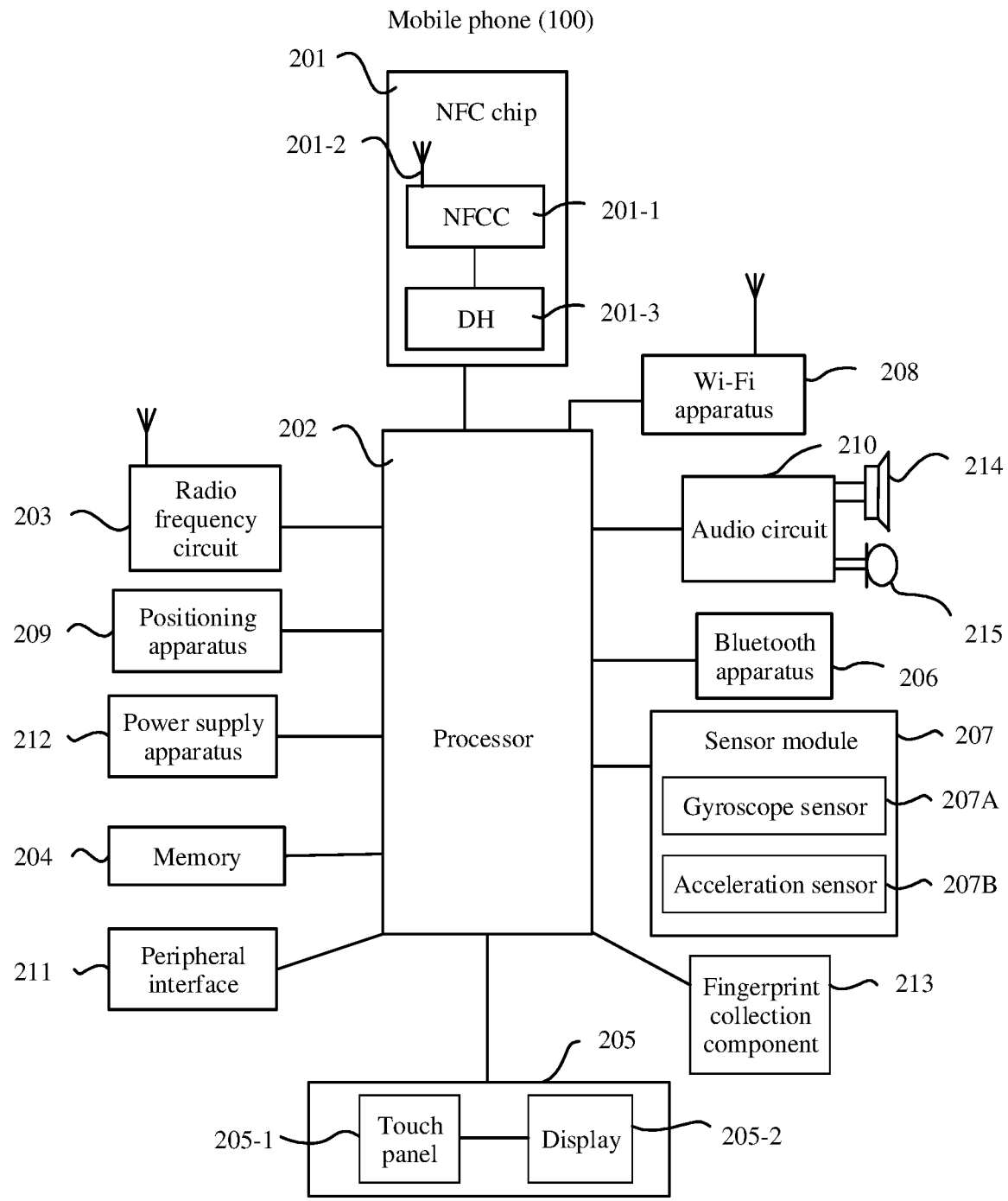
FIG. 2 is a schematic diagram of an example of a hardware structure of an electronic device according to an embodiment of this application.

FIG. 2 is a schematic diagram of an example of a hardware structure of an electronic device by using a mobile phone as an example. As shown in FIG. 2, the mobile phone 100 may specifically include components such as an NFC chip 201, a processor 202, a radio frequency (RF) circuit 203, a memory 204, a touchscreen 205, a Bluetooth apparatus 206, a sensor module 207, a Wi-Fi apparatus 208, a positioning apparatus 209, an audio circuit 210, a peripheral interface 211, and a power supply apparatus 212. The sensor module 207 may include a gyroscope sensor 207A, an acceleration sensor 207B, and the like.

These components may perform communication through one or more communication buses or signal lines (not shown in FIG. 2). A person skilled in the art may understand that the hardware structure shown in FIG. 2 does not constitute a limitation on a smartphone, and the mobile phone 100 may include more or fewer components than those shown in the figure, or may combine some components, or may have different component arrangements.

The following describes the components of the mobile phone 100 in detail with reference to FIG. 2.

The NFC chip 201 includes an NFC controller (near field communication controller, NFCC) 201-1, a radio frequency antenna 201-2, a device host (device host, DH) 201-3, and one or more security elements (Security Element, SE) (not shown in FIG. 2). The NFCC 201-1 is mainly configured to modulate and demodulate an NFC radio frequency signal and process an NFC protocol. The NFCC 201-1 is connected to the radio frequency antenna 201-2 to implement sending and receiving of an NFC radio signal. The DH 201-3 is responsible for management of the NFCC 201-1, for example, initialization, configuration, and power management. The SE is configured to provide a secure execution environment (for example, authentication or authorization) and a sensitive data storage environment for an NFC application. The SE is a secure element chip. The SE may simultaneously carry a plurality of NFC applications.

In some embodiments, the DH 201-3 may be disposed in the processor 202 of the mobile phone 100 and is responsible for managing the NFCC 201-1.

In this embodiment of this application, when detecting a radio signal, the NFCC 201-1 may identify information such as a frequency of the radio signal, to determine whether the radio signal is an NFC radio frequency signal. For example, when it is identified that the radio signal is a 13.56 MHz radio signal, the NFCC 201-1 determines that the radio signal is the NFC radio frequency signal.

The processor 202 is a control center of the mobile phone 100, and connects to various parts of the mobile phone 100 through various interfaces and lines. The processor 202 performs various functions of the mobile phone 100 and processes data by running or executing a client application (referred to as app for short below) stored in the memory 204 and invoking data stored in the memory 204. In some embodiments, the processor 202 may be a general-purpose central processing unit (central processing unit, CPU), a microprocessor, an application-specific integrated circuit (application-specific integrated circuit, ASIC), or one or more integrated circuits configured to control program execution of the solutions of this application. The processor 202 may include one or more CPUs. For example, the processor 202 may be a Kirin 960 chip manufactured by Huawei Technologies Co., Ltd.

The radio frequency circuit 203 may be configured to receive and send a radio signal in an information receiving/sending process or a call process. Particularly, after receiving downlink data from a base station, the radio frequency circuit 203 may send the downlink data to the processor 202 for processing, and send related uplink data to the base station. The radio frequency circuit usually includes but is not limited to an antenna, at least one amplifier, a transceiver, a coupler, a low noise amplifier, a duplexer, and the like. In addition, the radio frequency circuit 203 may further communicate with another device through wireless communication. The wireless communication may use any communication standard or protocol, including but not limited to a global system for mobile communications, a general packet radio service, code division multiple access, wideband code division multiple access, long term evolution, an email, a short message service, and the like.

The memory 204 is configured to store an application and data. The memory 204 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, optical disc storage (including a compressed optical disc, a laser disc, an optical disc, a digital versatile disc, a Blu-ray disc, or the like), magnetic disk storage medium or another magnetic storage device, or any other medium that can be used to carry or store expected program code in a form of instructions or a data structure and that is accessible to a computer, but is not limited thereto. The processor 202 performs various functions of the mobile phone 100 and data processing by running the application and the data that are stored in the memory 204. The memory 204 mainly includes a program storage area and a data storage area. The program storage area may store an operating system, and an application required by at least one function (for example, a sound playing function or an image playing function). The data storage area may store data (for example, audio data or a phone book) created based on use of the mobile phone 100. The memory 204 may store instructions for implementing two modular functions: a receiving instruction and a connection instruction, and the processor 202 controls execution of the instructions. The processor 202 is configured to execute the computer-executable instructions stored in the memory 204, to implement a data transmission method provided in the following embodiment of this application. In addition, the memory 204 may include a high-speed random access memory, and may further include a non-volatile memory such as a magnetic disk storage device and a flash memory, or another volatile solid-state storage device. The memory 204 may store various operating systems, for example, an iOS operating system developed by Apple and an Android operating system developed by Google.

The touchscreen 205 may include a touch panel 205-1 and a display 205-2. The touch panel 205-1 may collect a touch event (such as an operation performed by a user of the mobile phone 100 on or near the touch panel 205-1 by using any proper object such as a finger or a stylus) performed by the user on or near the touch panel 205-1, and send collected touch information to another component such as the processor 202. Although in FIG. 2, the touch panel 205-1 and the display 205-2 are used as two independent components to implement input and output functions of the mobile phone 100, in some embodiments, the touch panel 205-1 and the display 205-2 may be integrated to implement the input and output functions of the mobile phone 100. It may be understood that the touchscreen 205 is formed by stacking a plurality of layers of materials. In this embodiment of this application, only the touch panel (layer) and the display (layer) are displayed, and another layer is not recorded in this embodiment of this application. Moreover, in some other embodiments of this application, the touch panel 205-1 may cover the display 205-2, and a size of the touch panel 205-1 is greater than a size of the display 205-2, so that the display 205-2 is totally covered by the touch panel 205-1. Alternatively, the touch panel 205-1 may be disposed on the front of the mobile phone 100 in a full panel form, that is, all touches of the user on the front of the mobile phone 100 can be sensed by the mobile phone. In this way, full touch control experience on the front of a smartphone can be implemented. In some other embodiments, the touch panel 205-1 is disposed on the front of the mobile phone 100 in the full panel form, and the display 205-2 may also be disposed on the front of the mobile phone 100 in the full panel form. In this way, a bezel-less structure can be implemented on the front of a smartphone.

In this embodiment of this application, the mobile phone 100 may further have a fingerprint recognition function. For example, a fingerprint reader may be disposed on the back (for example, below a rear-facing camera) of the mobile phone 100 or on the front (for example, below the touchscreen 205) of the mobile phone 100. For another example, a fingerprint collection component 213 may be disposed on the touchscreen 205 to implement the fingerprint recognition function. In other words, the fingerprint collection component 213 may be integrated into the touchscreen 205 to implement the fingerprint recognition function of the mobile phone 100. In this case, the fingerprint collection component 213 is disposed on the touchscreen 205, and may be a part of the touchscreen 205, or may be disposed on the touchscreen 205 in another manner. A main component of the fingerprint collection component 213 in this embodiment of this application is a fingerprint sensor. The fingerprint sensor may use any type of sensing technology, including but not limited to an optical sensing technology, a capacitive sensing technology, a piezoelectric sensing technology, or an ultrasonic sensing technology.

In this embodiment of this application, the mobile phone 100 may further include the Bluetooth apparatus 206, configured to implement data exchange between the mobile phone 100 and another terminal (for example, a smartphone or a smartwatch) at a short distance from the mobile phone 100. In this embodiment of this application, the Bluetooth apparatus may be an integrated circuit, a Bluetooth chip, or the like.

The Wi-Fi apparatus 208 is configured to provide the mobile phone 100 with network access following Wi-Fi related standards and protocols. The mobile phone 100 may be connected to a Wi-Fi access point by using the Wi-Fi apparatus 208, to help the user to receive and send emails, browse a web page, access streaming media, and the like, and the mobile phone 100 provides wireless broadband Internet access to the user. In some other embodiments, the Wi-Fi apparatus 208 may also be used as a Wi-Fi wireless access point or may provide Wi-Fi network access to another terminal.

The gyroscope sensor 207A may be configured to determine a motion posture of the mobile phone 100. In some embodiments, the gyroscope sensor 207A may be used to determine angular velocities of the mobile phone 100 around three axes (namely, x, y, and z axes). The gyroscope sensor 207A may be configured to implement image stabilization during photographing. Specifically, in this embodiment of this application, the mobile phone 100 may determine a specific posture of the mobile phone 100 in space by using data collected by the gyroscope sensor 207A, to predict a movement direction of the mobile phone 100.

The acceleration sensor 207B may detect values of acceleration in various directions (usually on three axes) of the mobile phone 100. When the mobile phone 100 is static, a value and a direction of gravity may be detected. The acceleration sensor 207B may be configured to identify a posture of the mobile phone, and is used in an application such as switching between a landscape mode and a portrait mode, a pedometer, and magnetometer posture calibration. Specifically, in this embodiment of this application, the mobile phone 100 may determine a movement speed and a movement direction of the mobile phone 100 by using data collected by the acceleration sensor 207B, to predict a scenario type of the mobile phone 100.

The positioning apparatus 209 is configured to provide a geographical location for the mobile phone 100. It may be understood that the positioning apparatus 209 may be specifically a receiver of a positioning system such as a global positioning system (GPS), a BeiDou navigation satellite system, a Galileo satellite navigation system, or a Russian GLONASS. After receiving the geographical location sent by the positioning system, the positioning apparatus 209 sends the information to the processor 202 for processing or to the memory 204 for storage. In some other embodiments, the positioning apparatus 209 may be a receiver of an assisted global positioning system (AGPS). The AGPS system assists the positioning apparatus 209 in completing ranging and positioning services as an assisted server. In this case, an assisted positioning server provides positioning assistance by communicating with the positioning apparatus 209 (namely, a receiver of the GPS) of the terminal such as the mobile phone 100 over a wireless communication network. In some other embodiments, the positioning apparatus 209 may alternatively be a positioning technology based on a Wi-Fi access point. Each Wi-Fi access point has a globally unique MAC address. If Wi-Fi on the terminal is turned on, broadcast signals of Wi-Fi access points around the terminal may be scanned and collected. Therefore, MAC addresses broadcast by the Wi-Fi access points may be obtained. The terminal sends, to the positioning server over the wireless communication network, data (for example, the MAC addresses) that can represent the Wi-Fi access points. The positioning server finds geographical locations of the Wi-Fi access points, computes a geographical location of the terminal by combining intensity of Wi-Fi broadcast signals, and sends the geographical location of the terminal to the positioning apparatus 209 of the terminal.

The audio circuit 210, a loudspeaker 214, and a microphone 215 may provide an audio interface between the user and the mobile phone 100. The audio circuit 210 may convert received audio data into an electrical signal, and transmit the electrical signal to the loudspeaker 214. The loudspeaker 214 converts the electrical signal into a sound signal and outputs the sound signal. On the other hand, the microphone 215 converts a collected sound signal into an electrical signal, and the audio circuit 210 receives the electrical signal and converts the electrical signal into audio data, and then outputs the audio data to the RF circuit 203, so that the RF circuit 203 sends the audio data to, for example, another smartphone, or transmits the audio data to the memory 204 for further processing.

The peripheral interface 211 is used to provide various interfaces for an external input/output device (for example, a keyboard, a mouse, an external display, an external memory, or a subscriber identification module card). For example, the mouse is connected through a universal serial bus (USB) interface, and a subscriber identity module (SIM) card provided by an operator is connected by using a metal contact on a subscriber identity module slot. The peripheral interface 211 may be used to couple the external input/output peripheral device to the processor 202 and the memory 204.

The mobile phone 100 may further include the power supply apparatus 212 (for example, a battery and a power management chip) that supplies power to the components. The battery may be logically connected to the processor 202 by using the power management chip, so that functions such as charging management, discharging management, and power consumption management are implemented by using the power supply apparatus 212.

Although not shown in FIG. 2, the mobile phone 100 may further include a camera (a front-facing camera and/or a rear-facing camera), a flash, a micro projection apparatus, and the like. Details are not described herein.

In the method for invoking the NFC application provided in this application, an electronic device (for example, a mobile phone) may intelligently predicts a use requirement of a user for the NFC applications based on context awareness by analyzing one or more of current scenario information such as geographical location information, time information, weather information, motion information, or usage information of the electronic device, and preset a group of to-be-used NFC applications (for example, a first NFC application group) based on a prediction result, so that the electronic device responds, based on a use order of the NFC applications in the first NFC application group, to an NFC application invoking request received by the electronic device. The method for invoking the NFC application provided in this application can resolve problems of complex operations and low user experience that are caused because the user needs to manually select the to-be-used NFC application. The electronic device can more intelligently predict the use requirement of the user, thereby providing the user with more convenient experience of using the NFC application.

In embodiments of this application, the NFC application invoking request received by the mobile phone 100 is usually initiated by the terminal device (referred to as an NFC device for short below) supporting NFC. For example, the NFC device may be the bus card reader shown in FIG. 1(a), or the POS device shown in FIG. 1(b). Alternatively, the NFC device may be an access control device (for example, a residential community access control device or a parking lot access control device) or an identity verification device (for example, a boarding verification device or a scenic spot real-name verification device), or may be another terminal device that supports NFC. A specific structure, a function, a usage scenario, and the like of the NFC device are not limited in embodiments of this application.

In some embodiments, the electronic device (for example, a mobile phone) may analyze the current scenario information by using an AI algorithm, and obtain a group of to-be-used NFC applications (for example, a first NFC application group) through prediction. For example, the AI algorithm may be a neural network algorithm, for example, a convolutional neural network algorithm. A specific AI algorithm and a calculation process are not limited in embodiments of this application.

The following embodiment of this application describes, by using the mobile phone 100 having the hardware structure shown in FIG. 2 as an example, the method for invoking the NFC application provided in embodiments of this application. It may be understood that the method for invoking the NFC application provided in this application may be applied to a mobile phone that has another hardware structure and supports a plurality of NFC application functions, or may be applied to another terminal device that supports a plurality of NFC application functions. In the following embodiment, that the terminal device is the mobile phone is used only as an example, and a specific type and structure of the terminal device are not limited.

Figure 3:
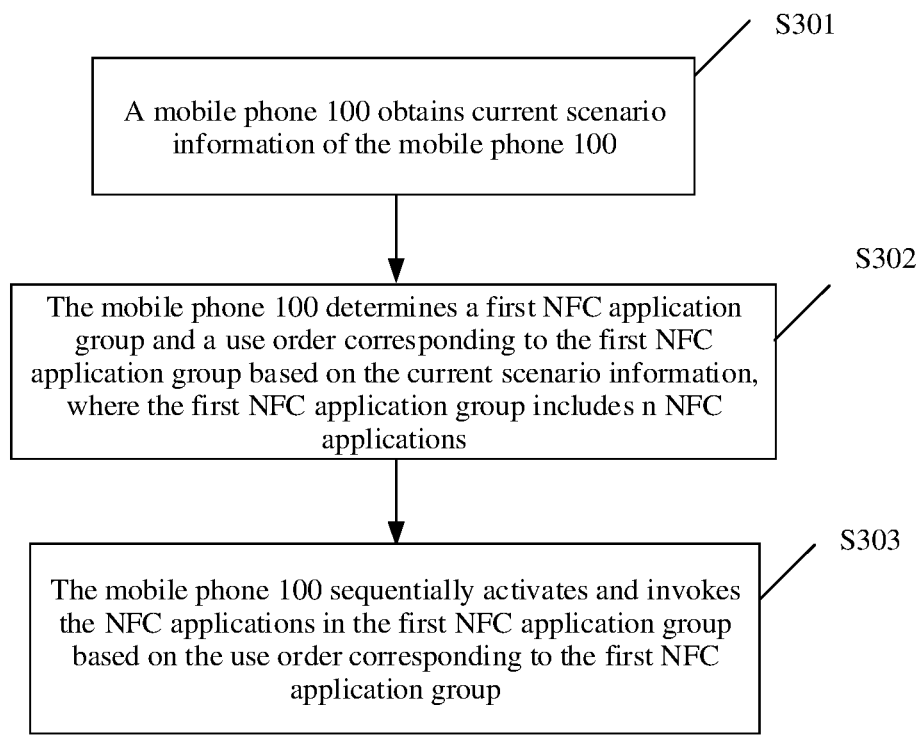
FIG. 3 is a flowchart of a method for invoking an NFC application according to an embodiment of this application.

As shown in FIG. 3, the method for invoking the NFC application provided in this embodiment of this application may include S301 to S303.

S301: The mobile phone 100 obtains current scenario information of the mobile phone 100.

In this application, the current scenario information of the mobile phone 100 includes but is not limited to one or more of geographical location information, time information, weather information, motion information, or usage information.

The geographical location information may include a type of a current location of the mobile phone 100, for example, an office building, a residential building, a subway station, a bus station, a shopping mall, a cinema, a scenic spot, an airport, or a high-speed railway station. The mobile phone 100 may obtain latitude and longitude information of the mobile phone 100 by using a positioning system such as a GPS, a BeiDou navigation satellite system, a Galileo navigation satellite system, or a Russian GLONASS, and determine a type of a location of the mobile phone 100 based on the latitude and longitude information of the mobile phone 100 and specific map data. For example, if the mobile phone 100 determines, based on the latitude and longitude information of the mobile phone 100 and the map data, that a residential building is at a latitude and a longitude at which the mobile phone 100 is located, the mobile phone 100 may determine that the type of the location of the mobile phone 100 is the residential building. The mobile phone 100 may further determine, based on authorization of the user and by using an image that is of an environment in which the mobile phone 100 is located and that is collected by using a camera, the type of the location of the mobile phone 100 based on a related technology such as image recognition. For example, the mobile phone 100 analyzes the image collected by the camera, and determines that the image includes an image feature of a bus station board. In this case, the mobile phone 100 may determine that the mobile phone is in a bus station.

In some embodiments, the geographical location information may further include positioning information of the mobile phone 100 obtained by the mobile phone 100 from a network device (for example, a location management function (location management function, LMF) network element), or may be other geographical location information used to determine usage scenario information of the NFC application of the mobile phone 100. A specific measurement manner and specific content of the geographical location information are not limited in this embodiment of this application.

The motion information is used to indicate a motion status of the mobile phone 100. For example, the motion information may include but is not limited to a movement speed and/or a movement direction of the mobile phone 100. For example, the mobile phone 100 may obtain motion data through measurement by using a sensor (such as an acceleration sensor or a gyroscope sensor) or a satellite (such as a GPS, a BeiDou satellite, a Galileo satellite, or a GLONASS). The specific measurement manner of the motion information is not limited in this embodiment of this application. In addition, for a specific method and a specific process of obtaining the motion data by the mobile phone 100 through measurement by using the sensor or the satellite, refer to explanations and descriptions in a conventional technology. Details are not described herein.

The time information is used to indicate a current date and a specific moment. Further, the time information may be used to indicate whether current time is a legal workday or a legal holiday. The weather information is used to indicate current weather, air quality, temperature, and the like. The time information and the weather information may be obtained by the mobile phone 100 by synchronizing with the Internet.

The usage information is used to indicate information that the mobile phone 100 uses the NFC applications within a preset time range prior to a time indicated by the time information. For example, the usage information may include information such as a time and/or a geographical location at which the mobile phone 100 invokes each NFC application in a preset time period (for example, one month) prior to a current moment.

In this application, the mobile phone 100 may predict a subsequent use requirement of the user for the NFC application based on the current scenario information of the mobile phone 100. Specifically, the mobile phone 100 may predict, based on the current scenario information of the mobile phone 100, a usage scenario type of the NFC application that is about to be invoked by the mobile phone 100.

For example, the time information indicates that the current time is between 7:40 a.m. and 8:10 a.m. on a workday, and the usage information indicates that the mobile phone 100 sequentially invokes a "house key" application, a "residential building access control card" application, a "residential community parking card" application, and a "residential community access control card" application within a time period from 7:40 a.m. to 8:10 a.m. on each workday. In this case, the mobile phone 100 may deduce that the user is about to leave home, that is, the usage scenario category of the NFC application to be invoked by the mobile phone 100 is a home scenario. In addition, the mobile phone 100 deduces that the user may subsequently need to sequentially use the "house key" application, the "residential building access control card" application, the "residential community parking card" application, and the "residential community access control card" application.

For another example, the geographical location information indicates that the mobile phone 100 is currently located at a place G, and the place G is a bus station. The information indicates that the mobile phone 100 invokes the "bus card" application each time the mobile phone 100 is located at the place G, and invokes a "subway card" application immediately when the mobile phone 100 arrives at a place K, where the place K is a subway station. In this case, the mobile phone 100 may deduce that the user is about to take a public transportation vehicle, that is, the usage scenario category of the NFC application to be invoked by the mobile phone 100 is a public traffic scenario. More specifically, the mobile phone 100 may deduce that the user needs to first take a bus and then take a subway. In other words, the user may subsequently need to sequentially use the "bus card" application and the "subway card" application.

For another example, the geographical location information indicates that the mobile phone 100 is currently located at a bus station beside a scenic spot. However, the weather information indicates that the current weather is heavy rain. In this case, the mobile phone 100 may deduce that a possibility that the user is about to take a bus is greater than a possibility that the user enters the scenic spot, that is, the usage scenario category of the NFC application to be invoked by the mobile phone 100 is the public traffic scenario. In addition, the mobile phone 100 deduces that the user may subsequently need to use a "bus card".

For another example, the geographical location information indicates that the mobile phone 100 is now located at a gateway of a residential community of the user. The motion information indicates that the movement speed of the mobile phone 100 is 1 meter/second (m/s), and the movement direction is a direction of the mobile phone 100 entering the residential community. In this case, the mobile phone 100 may deduce that the user is about to go home through a community access control system, that is, the usage scenario category of the NFC application to be invoked by the mobile phone 100 is the home scenario. More specifically, the mobile phone 100 may deduce that the user is about to walk home, and subsequently needs to sequentially use the "residential community access control card", the "residential building access control card" application, and the "house key" application.

For another example, the geographical location information indicates that the mobile phone 100 is now located near a parking lot of a shopping mall L. The motion information indicates that the movement speed of the mobile phone 100 is 8 meters/second (m/s), and the movement direction is a direction of the mobile phone 100 entering the parking lot of the shopping mall L. The time information indicates that the current time is a noon of a rest day. In this case, the mobile phone 100 may deduce that the user is about to drive to the shopping mall, that is, the usage scenario category of the NFC application to be invoked by the mobile phone 100 is a shopping mall scenario. In addition, the mobile phone 100 deduces that the user may subsequently need to sequentially use a "shopping mall parking card" application and a "payment card" application.

S302: The mobile phone 100 determines a first NFC application group and a use order corresponding to the first NFC application group based on the current scenario information, where the first NFC application group includes n NFC applications.

A plurality of NFC applications included in the first NFC application group have a use order. The use order may be a priority order, a geographical order, a time order, or the like. In this application, after the mobile phone 100 predicts the subsequent use requirement of the user for the NFC application based on the current scenario information of the mobile phone 100, the mobile phone 100 may determine a group of NFC applications (namely, the first NFC application group) to be invoked. It is assumed that the first NFC application group includes n NFC applications, where n≥2 and n is a positive integer.

For example, when the mobile phone 100 predicts, based on the current scenario information of the mobile phone 100, that the user is about to leave home next, and the user may subsequently need to sequentially use the "house key" application, the "residential building access control card" application, the "residential community parking card" application, and the "residential community access control card" application, the mobile phone 100 may determine that the first NFC application group to be invoked includes the "house key" application, the "residential building access control card" application, the "residential community parking card" application, and the "residential community access control card" application that have a use order.

In the foregoing example, the use order of the plurality of NFC applications in the first NFC application group may be a priority order: the "house key" application>the "residential building access control card" application>the "residential community parking card" application>the "residential community access control card" application.

Alternatively, in the foregoing example, the use order of the plurality of NFC applications in the first NFC application group may be a time order: the "house key" application→the "residential building access control card" application→the "residential community parking card" application→the "residential community access control card" application.

Alternatively, in the foregoing example, the use order of the plurality of NFC applications in the first NFC application group may be a location order: A home corresponds to the "house key" application, a residential building door corresponds to the "residential building access control card" application, a residential community parking lot corresponds to the "residential community parking card" application, and a residential community gate corresponds to the "residential community access control card" application.

For another example, when the mobile phone 100 predicts, based on the current scenario information of the mobile phone 100, that the user is about to leave the residential community and take a bus to work next, and the user may subsequently need to sequentially use the "bus card" application and a "company attendance card" application, the mobile phone 100 may determine that the first NFC application group to be invoked includes the "bus card" application and the "company attendance card" application that have a use order. Alternatively, when the mobile phone 100 predicts, based on the current scenario information of the mobile phone 100, that the user is about to leave the residential community and drive to work next, and the user may subsequently need to sequentially use an "office building parking card" application and the "company attendance card" application, the mobile phone 100 may determine that the first NFC application group to be invoked includes the "office building parking card" application and the "company attendance card" application that have a use order.

For another example, when the mobile phone 100 predicts, based on the current scenario information of the mobile phone 100, that the user is about to arrive at a scenic spot next, and the user may subsequently need to sequentially use the "identity card" application (used for identity verification during ticket purchasing), the "payment card" application (used for ticket purchasing payment), and the "identity card" application (used for identity verification during scenic spot entering), the mobile phone 100 may determine that the first NFC application group to be invoked includes the "identity card" application, the "payment card" application, and the "identity card" application that have a use order.

In some embodiments, the mobile phone 100 may pre-store a plurality of NFC application groups. Each NFC application group includes a plurality of NFC applications that have a use order. Step S302 may include:

The mobile phone 100 determines, based on the current scenario information, the first NFC application group from the plurality of NFC application groups pre-stored in the mobile phone 100, where the first NFC application group may be a group of NFC applications, in the plurality of NFC application groups pre-stored in the mobile phone 100, whose usage scenario information has the highest matching degree with the current scenario information obtained by the mobile phone 100 at step S301.

Alternatively, the first NFC application group determined by the mobile phone 100 at S302 may be an NFC application group determined by the mobile phone 100 based on another rule from the plurality of NFC application groups that match the current scenario information obtained by the mobile phone 100 at step S3o1. For example, the mobile phone 100 may randomly select an NFC application group from the plurality of NFC application groups that match the current scenario information obtained by the mobile phone 100 at step S301. For another example, the mobile phone 100 may determine, based on a latest usage record of an NFC application group corresponding to the current scenario information, the first NFC application group from the plurality of NFC application groups that match the current scenario information obtained by the mobile phone 100 at step S301.

Optionally, in this embodiment of this application, the plurality of NFC application groups pre-stored in the mobile phone 100 and the current scenario information obtained by the mobile phone 100 at S301 may be in a one-to-one correspondence. Alternatively, one piece of current scenario information may correspond to a plurality of NFC application groups. Quantities of NFC application groups corresponding to different scenario information are not limited in this embodiment of this application.

Figure 4:
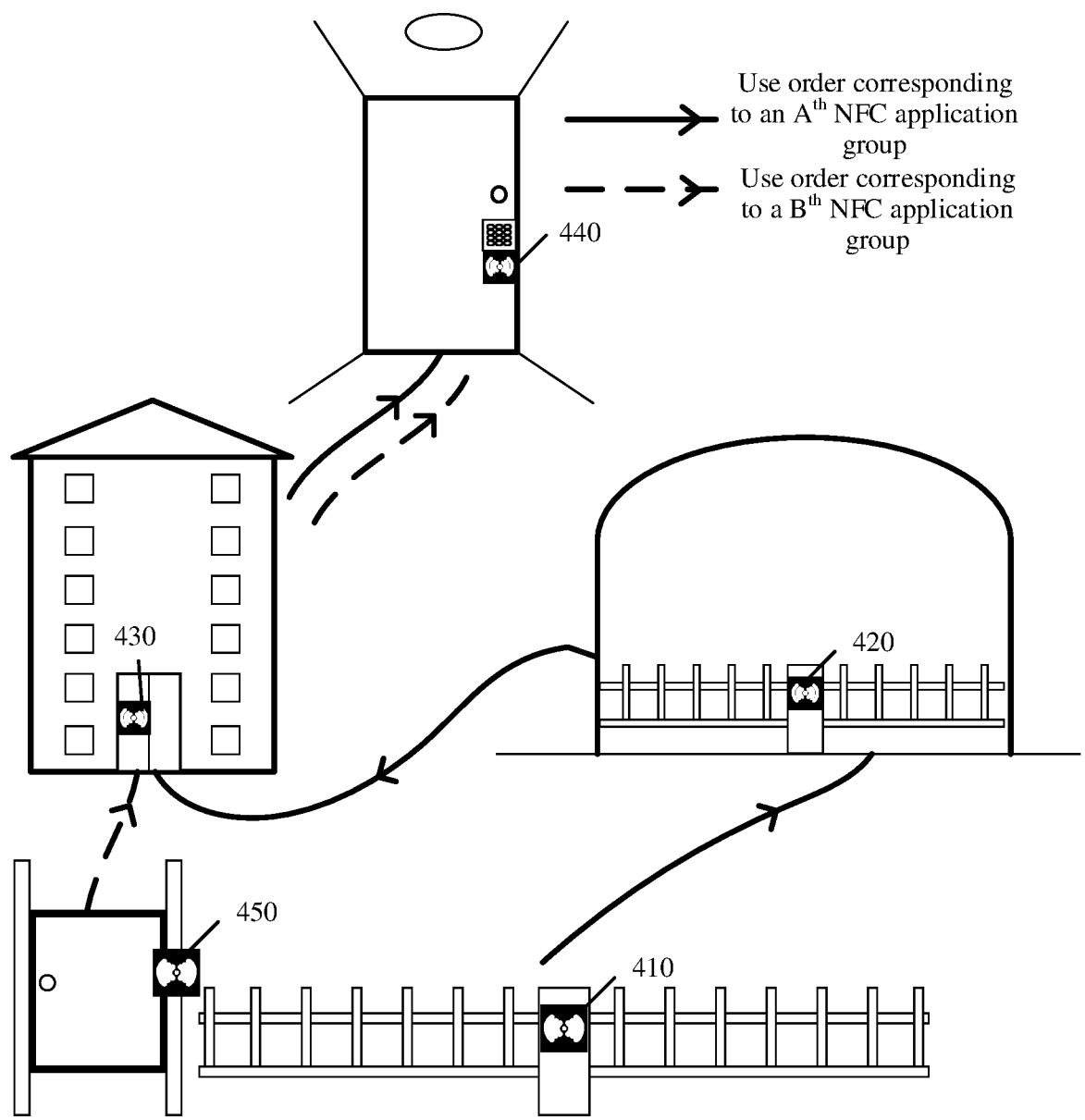
FIG. 4 is a schematic diagram of examples of card using orders in two home scenario categories according to an embodiment of this application.

For example, when the current scenario information of the mobile phone 100 does not include the motion information, if the mobile phone 100 predicts, based on the current scenario information of the mobile phone 100, that the user is about to enter the residential community and go home next, the mobile phone 100 deduces that the user may use an $A^{th}$ NFC application group in FIG. 4 (that is, the user drives home), or may use a $B^{th}$ NFC application group in FIG. 4 (that is, the user walks home).

As shown in FIG. 4, an application use order shown by a solid line is an application use order corresponding to the $A^{th}$ NFC application group (that is, the user drives home). The $A^{th}$ NFC application group includes applications whose time order is: the "residential community access control card" application→the "residential community parking card" application→the "residential building access control card" application→the "house key" application. The "residential community access control card" application is used to pass through a residential community access control system 410, the "residential community parking card" application is used to pass through a community underground garage access control system 420, the "residential building access control card" application is used to pass through a residential building door 430, and the "house key" application is used to pass through user's house door 440.

As shown in FIG. 4, an application use order shown by a dashed line is an application use order corresponding to the $B^{th}$ NFC application group (that is, the user walks home). The $B^{th}$ NFC application group includes applications whose time order is: the "residential community access control card" application→the "residential building access control card" application→the "house key" application. The "residential community access control card" application is used to pass through a residential community access control system 450, the "residential building access control card" application is used to pass through the residential building door 430, and the "house key" application is used to pass through user's house door 440.

In the scenario shown in FIG. 4, optionally, if the current scenario information of the mobile phone 100 includes the motion information, and motion data indicates that the movement speed of the mobile phone 100 is 8 m/s, the mobile phone 100 may further predict that the user drives home. In other words, the mobile phone 100 may determine that the first NFC application group is the $A^{th}$ NFC application group shown in FIG. 4. In this case, the mobile phone 100 sequentially processes, in the application use order of 410→420→430→440 corresponding to the $A^{th}$ NFC application group, NFC application invoking requests that are received by the mobile phone 100 and that are respectively from the residential community access control system, the residential underground garage access control system, the residential building access control system, and the house door access control system.

Alternatively, if the current scenario information of the mobile phone 100 includes the motion information, and the motion data indicates that the movement speed of the mobile phone 100 is 1 m/s, the mobile phone 100 may further predict that the user walks home. In this case, the mobile phone 100 sequentially processes, in the application use order of 450→430→440 corresponding to the $B^{th}$ NFC application group, NFC application invoking requests that are received by the mobile phone 100 and that are respectively from the residential community access control system, the residential building access control system, and the house door access control system.

It may be understood that, in this application, one NFC application may be associated with a plurality of analog cards, or in other words, one NFC application may be bound to a plurality of analog cards. For example, the "payment card" application may be bound to a plurality of bank cards (such as China Merchants Bank, China Construction Bank, and Bank of China). The "transportation card" application can be bound to a bus card and a subway card. Further, the "transportation card" application may be bound to bus cards and subway cards of a plurality of cities such as Beijing, Shanghai, Xi'an, and Shenzhen. However, the mobile phone 100 can invoke only one analog card in one NFC application at a moment. For example, when the mobile phone 100 invokes the "payment card" application, the mobile phone 100 may invoke any one of a plurality of bank cards bound to the "payment card" application. The mobile phone 100 may alternatively invoke a user-defined default bank card, and the mobile phone 100 may alternatively invoke a specific analog card in an NFC application based on another rule. For another example, when the mobile phone 100 invokes the "transportation card" application to take a public transportation vehicle, the mobile phone 100 may determine, in combination with the geographical location information of the mobile phone 100, a city whose transportation card is to be invoked, and determine whether to invoke a bus card or a subway card. A selection rule of a specific analog card in an NFC application is not limited in this embodiment of this application.

S303: The mobile phone 100 sequentially activates and invokes the NFC applications in the first NFC application group based on the use order corresponding to the first NFC application group.

It may be understood that, in this application, after the mobile phone 100 determines the first NFC application group, the mobile phone 100 may preset the n NFC applications in the first NFC application group as to-be-used NFC applications. For example, the mobile phone 100 may preset activation occasions of the n NFC applications.

For example, the mobile phone 100 may first activate a first NFC application in the first NFC application group, and then activate a second NFC application after the first NFC application is successfully used, and so on. After an $i^{th}$ NFC application is successfully used, the mobile phone 100 activates an $(i+1)^{th}$ NFC application. i is a positive integer, and i<n. The mobile phone 100 sequentially activates the n NFC applications in the first NFC application group based on the preset activation occasions until the n NFC applications in the first NFC application group are totally invoked.

The first NFC application is a first invoked NFC application in the first NFC application group in a usage scenario corresponding to the usage scenario information of the first NFC application group. The usage scenario information matches the current scenario information obtained by the mobile phone 100 at S301. The usage scenario information includes one or more of geographical location information, time information, weather information, motion information, and operation information of the mobile phone 100 when the first NFC application group is invoked. The second NFC application is a second invoked NFC application in the first NFC application group in the usage scenario corresponding to the usage scenario information of the first NFC application group. The $i^{th}$ NFC application is an $i^{th}$ invoked NFC application in the first NFC application group in the usage scenario corresponding to the usage scenario information of the first NFC application group. The $(i+1)^{th}$ NFC application is an $(i+1)^{th}$ invoked NFC application in the first NFC application group in the usage scenario corresponding to the usage scenario information of the first NFC application group.

Figure 5A:
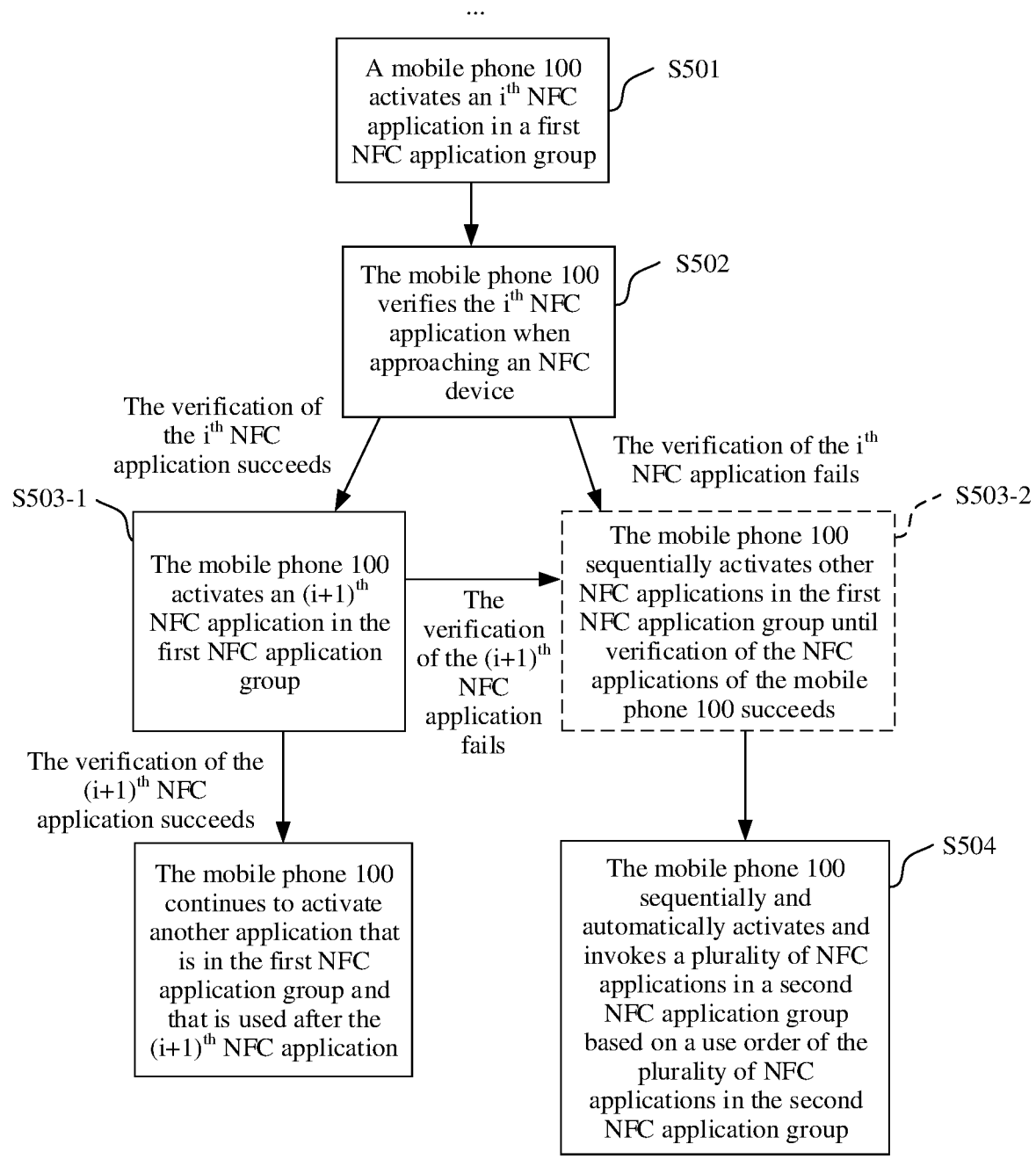
FIG. 5A is an example flowchart of activating an NFC application by an electronic device according to an embodiment of this application.

Referring to FIG. 5A, step S303 may include S501, S502, and S503-1 shown in FIG. 5A, or S501, S502, S503-2, and S504 shown in FIG. 5A.

S501: The mobile phone 100 activates the $i^{th}$ NFC application in the first NFC application group.

i is a positive integer, and i<n.

S502: The mobile phone 100 verifies the $i^{th}$ NFC application when approaching an NFC device.

If the verification of the $i^{th}$ NFC application in the mobile phone 100 succeeds, the mobile phone 100 performs S503-1; or if the verification of the $i^{th}$ NFC application in the mobile phone 100 fails, the mobile phone 100 performs S503-2.

S503-1: The mobile phone 100 activates the $(i+1)^{th}$ NFC application in the first NFC application group.

After the mobile phone 100 performs S503-1, if the verification of the $(i+1)^{th}$ NFC application in the mobile phone 100 succeeds, the mobile phone 100 continues to activate another application that is in the first NFC application group and that is used after the $(i+1)^{th}$ NFC application. If the verification of the $(i+1)^{th}$ NFC application in the mobile phone 100 fails, the mobile phone 100 performs S503-2.

S503-2: The mobile phone 100 sequentially activates other NFC applications in the first NFC application group until verification of the NFC applications of the mobile phone 100 succeeds.

In a possible implementation, the mobile phone 100 may sequentially activate the other NFC applications in the first NFC application group in an order of the $(i+1)^{th}$ NFC application→ . . . →an $n^{th}$ NFC application. Alternatively, the mobile phone 100 may sequentially activate the other NFC applications in the first NFC application group based on a separation distance between orders of invoking the other NFC applications in the first NFC application group and an order of invoking the $i^{th}$ NFC application in the first NFC application group. For example, the mobile phone 100 may sequentially activate the other NFC applications in the first NFC application group in an order of the $(i+1)^{th}$ NFC application→an $(i-1)^{th}$ NFC application→ . . . →the $n^{th}$ NFC application. A rule followed when the mobile phone 100 sequentially activates the other NFC applications in the first NFC application group is not limited in this embodiment of this application.

In some embodiments, after the mobile phone 100 sequentially activates the other NFC applications in the first NFC application group until the verification of the NFC applications of the mobile phone 100 succeeds, the method provided in this embodiment of this application may further include the following step S504.

S504: The mobile phone 100 sequentially and automatically activates and invokes a plurality of NFC applications in a second NFC application group based on a use order of the plurality of NFC applications in the second NFC application group.

The second NFC application group is an NFC application group, other than the first NFC application group, in the plurality of NFC application groups pre-stored in the mobile phone 100, whose usage scenario information has the highest matching degree with the current scenario information obtained by the mobile phone 100 at S301.

For example, if the current scenario information of the mobile phone 100 does not include the motion information, and the mobile phone 100 predicts, based on the current scenario information of the mobile phone 100, that the user is about to enter the residential community and go home next, the mobile phone 100 determines that the first NFC application group is the A$^{th}$ NFC application group shown in FIG. 4, that is, the user drives home. Next, the mobile phone 100 sequentially and automatically activates the plurality of NFC applications based on the use order of the plurality of NFC applications in the A$^{th}$ NFC application group. Assuming that a first NFC application invoking request received by the mobile phone 100 is from the residential community access control system 450, verification of a first NFC application (namely, the "residential community access control card" application used to pass through the residential community access control system 410) in the A$^{th}$ NFC application group cannot succeed to pass through the residential community access control system 450. In this case, the mobile phone 100 may attempt to sequentially invoke other NFC applications (including the "residential community parking card" application, the "residential building access control card" application, or the "house key" application) in the A$^{th}$ NFC application group in a specific activation frequency, until the mobile phone 100 successfully performs verification on the residential community access control system 450. Then, the mobile phone 100 may re-determine a to-be-used NFC application group. For example, the A$^{th}$ NFC application group is switched to the B$^{th}$ NFC application group, and an NFC application group corresponding to walking home is used to respond to an NFC device that is next approached by the mobile phone 100.

In some other embodiments, after the mobile phone 100 sequentially activates the other NFC applications in the first NFC application group until the verification of the NFC applications of the mobile phone 100 succeeds, the method provided in this embodiment of this application may further include the following step: The mobile phone 100 displays a second interface for the user to select a to-be-switched NFC application group. In addition, after the user selects a third NFC application group, in response to an operation of selecting the third NFC application group by the user, the mobile phone 100 sequentially activates and invokes NFC applications in the third NFC application group based on a use order corresponding to the third NFC application group.

In some embodiments, in a process in which the mobile phone 100 performs step S503-2, the method provided in this embodiment of this application may further include:

The mobile phone 100 records usage scenario information generated when the mobile phone 100 uses an NFC application, and updates, based on the usage scenario information that is recorded by the mobile phone 100 and generated when the mobile phone 100 uses the NFC application, a rule of using the NFC applications by the user. Further, the mobile phone 100 updates, based on an updated rule of using the NFC applications by the user, an NFC application group that matches the current scenario information.

Figure 5B:
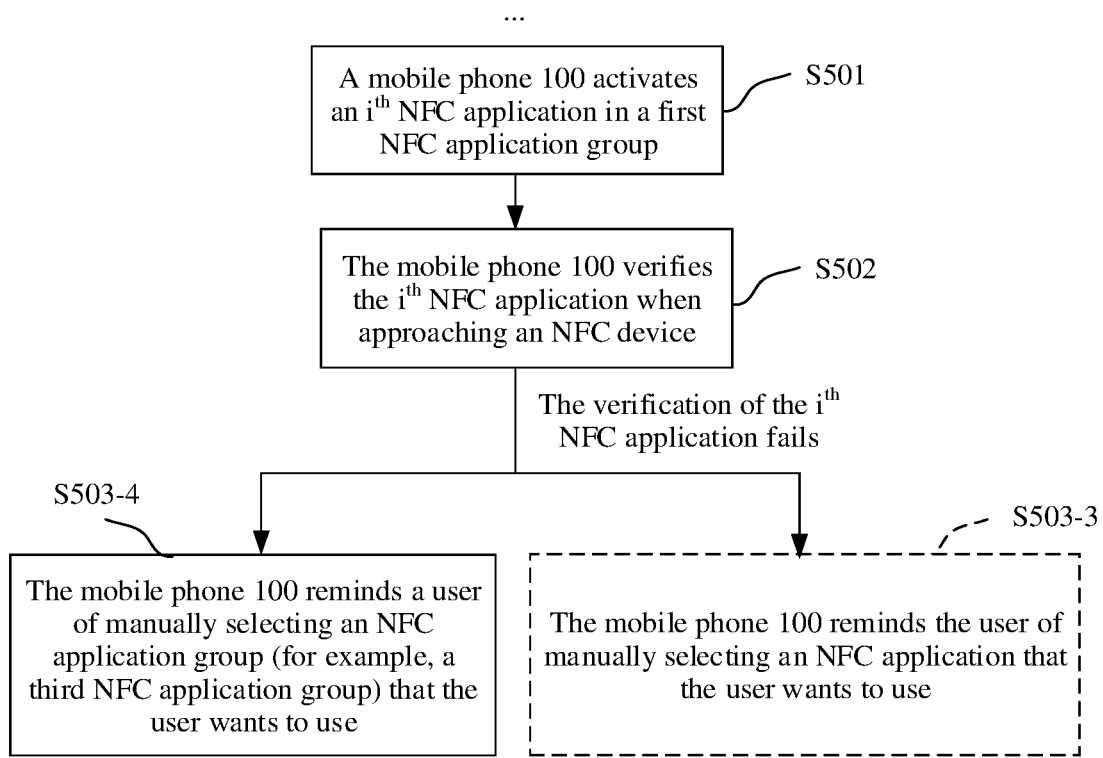
FIG. 5B is another example flowchart of activating an NFC application by an electronic device according to an embodiment of this application.

In this embodiment of this application, as shown in FIG. 5B, if the verification of the i$^{th}$ NFC application in the mobile phone 100 fails, the mobile phone 100 may further perform S503-3 or S503-4.

S503-3: The mobile phone 100 reminds the user of manually selecting an NFC application that the user wants to use.

For example, the mobile phone 100 may display an interface for the user to select a to-be-switched NFC application, and invoke the NFC application based on the NFC application manually selected by the user.

Further, after successfully verifying, by using the NFC applications manually selected by the user, the NFC device that is approached by the mobile phone 100, the mobile phone 100 may further display the second interface for the user to select which NFC application group to switch to. After the user selects the third NFC application group, in response to the operation of selecting the third NFC application group by the user, the mobile phone 100 sequentially activates and invokes the NFC applications in the third NFC application group based on the use order corresponding to the third NFC application group.

S503-4: The mobile phone 100 reminds the user of manually selecting an NFC application group (for example, the third NFC application group) that the user wants to use.

For example, the mobile phone 100 may display the second interface for the user to select a to-be-switched NFC application group. In addition, after the user selects the third NFC application group, in response to the operation of selecting the third NFC application group by the user, the mobile phone 100 sequentially activates and invokes the NFC applications in the third NFC application group based on the use order corresponding to the third NFC application group.

For example, the mobile phone 100 may display the second interface for the user to select which NFC application group to switch to. After the user selects the third NFC application group, in response to the operation of selecting the third NFC application group by the user, the mobile phone 100 sequentially activates and invokes the NFC applications in the third NFC application group based on the use order corresponding to the third NFC application group.

Further, in this embodiment of this application, if the mobile phone 100 pre-stores the plurality of NFC application groups, the following two cases exist:

Case (1): The plurality of NFC application groups pre-stored in the mobile phone 100 are drawn by the mobile phone 100 based on usage information of the mobile phone 100.

Specifically, the mobile phone 100 may obtain, based on information such as a time and/or a geographical location of using NFC applications by the mobile phone 100 within a preset time range, a rule of using the NFC applications by the user, then determine the plurality of NFC application groups based on the rule of using the NFC applications by the user, and pre-store the plurality of NFC application groups in the mobile phone 100.

For example, the usage information of the mobile phone 100 indicates that each time after invoking the "residential community access control card" application, the mobile phone 100 usually sequentially invokes the "residential parking card" application, the "residential building access control card" application, and the "house key" application. Alternatively, each time after invoking the "residential community access control card" application, the mobile phone 100 usually sequentially invokes the "residential building access control card" application and the "house key" application. In this case, the mobile phone 100 may obtain the A$^{th}$ NFC application group and the B$^{th}$ NFC application group shown in FIG. 4, and pre-store the A$^{th}$ NFC application group and the B$^{th}$ NFC application group in the mobile phone 100.

In this embodiment of this application, the plurality of NFC application groups pre-stored in the mobile phone 100 and a correspondence between the plurality of NFC application groups and scenario information may be visually displayed on a display interface of the mobile phone 100.

For example, the mobile phone 100 may display a setting interface of the NFC application groups and the scenario information in response to an operation of selecting "NFC" by the user on a "wireless and network" interface. The "wireless and network" interface may be an interface displayed by the mobile phone 100 in response to an operation of selecting "wireless and network" on a "settings" interface by the user.

Figure 6:
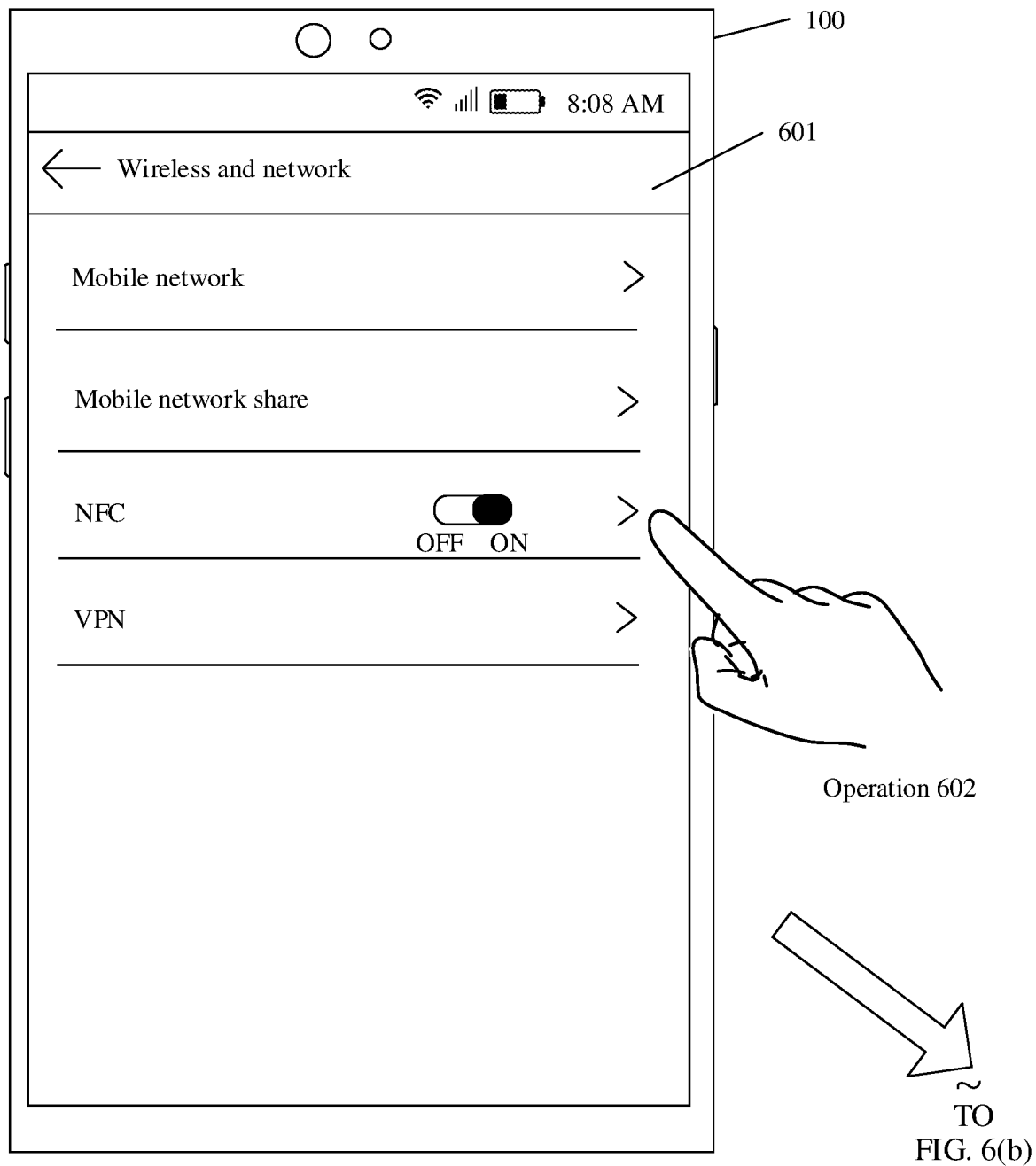
FIG. 6(a1), FIG. 6(a2)
Figure 6:
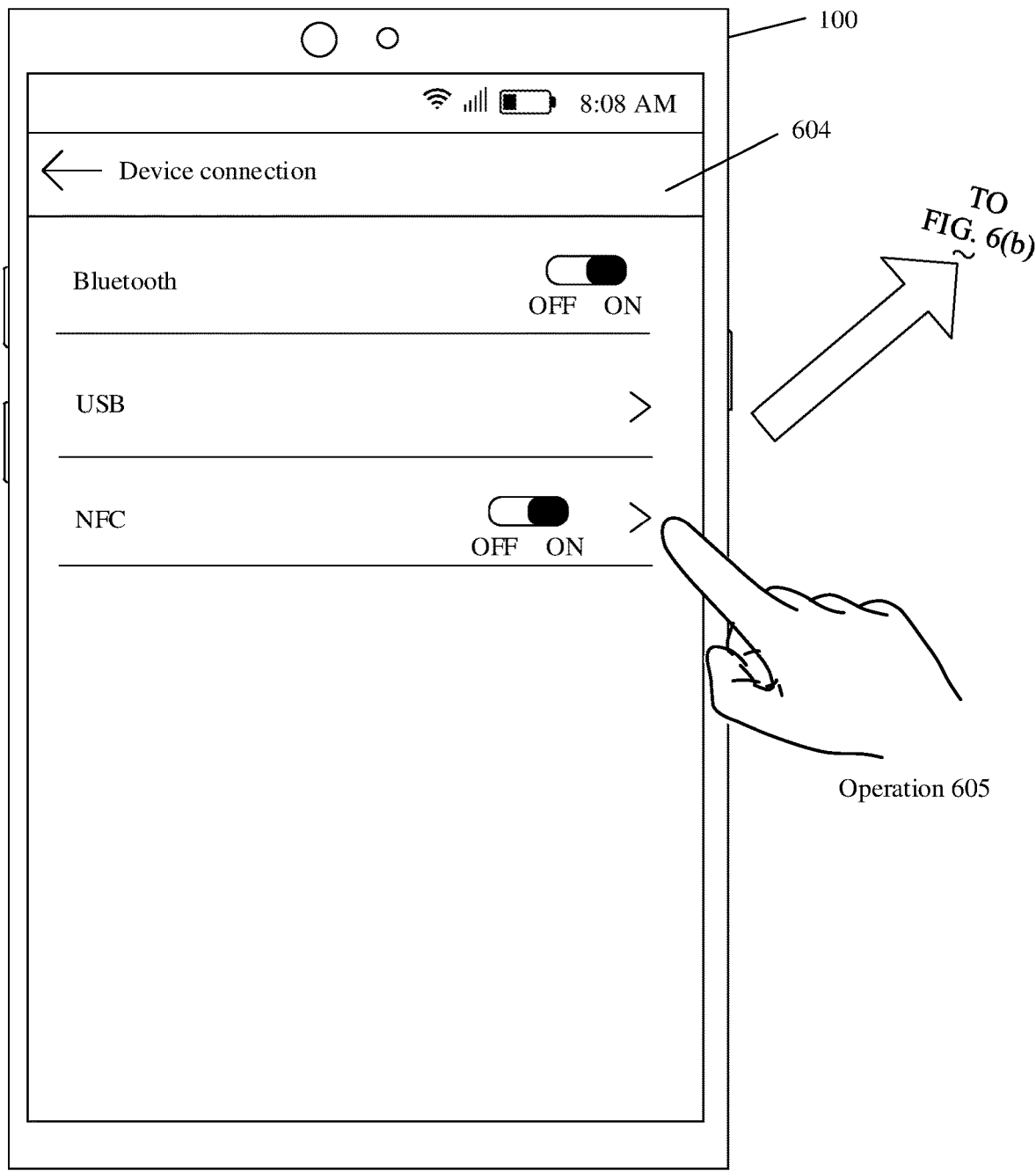
Figure 6B:
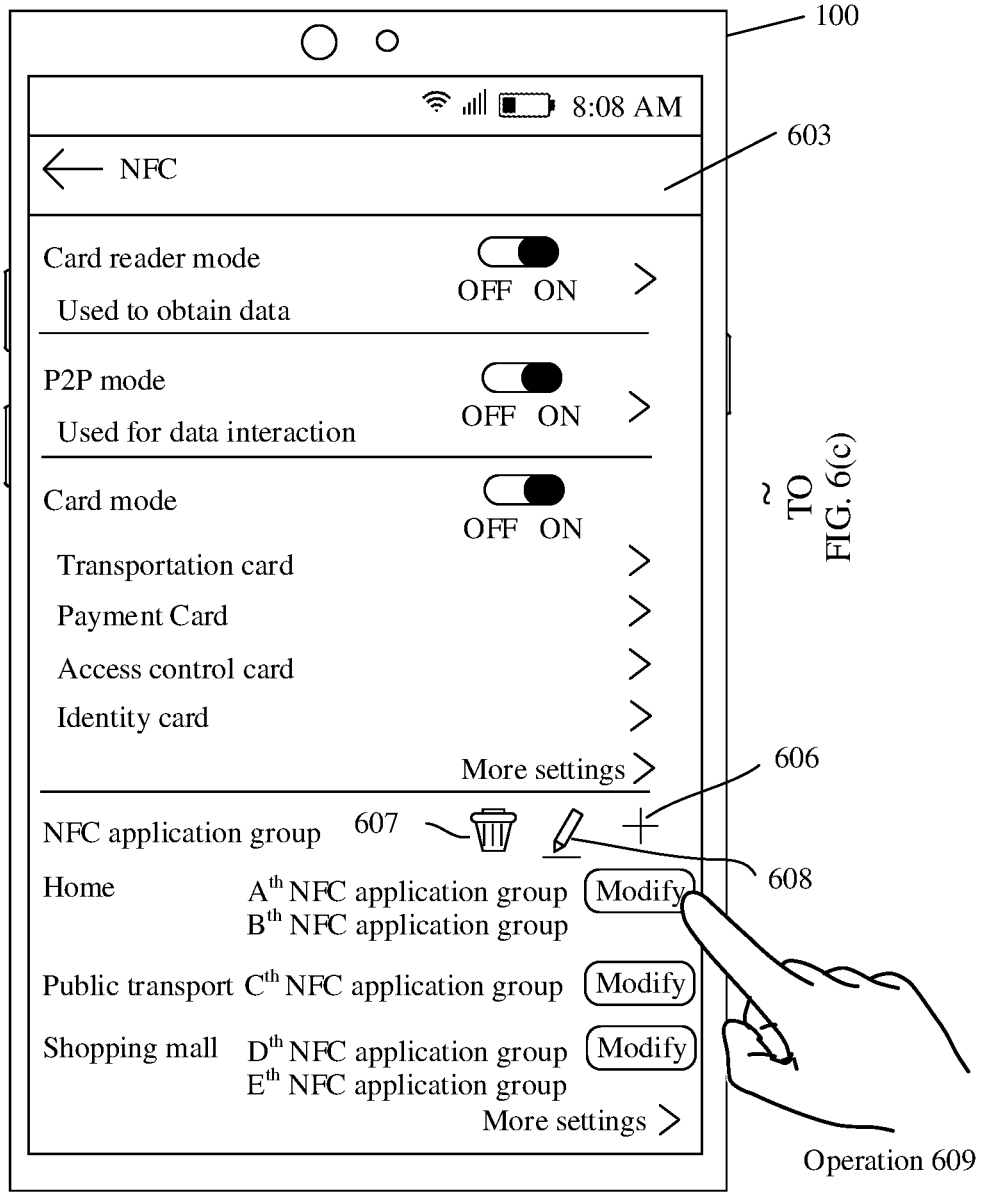
FIG. 6(b), and FIG. 6(c) are a schematic diagram of examples of entering an NFC interface and entering an interface for modifying an NFC application group according to an embodiment of this application.
Figure 6C:
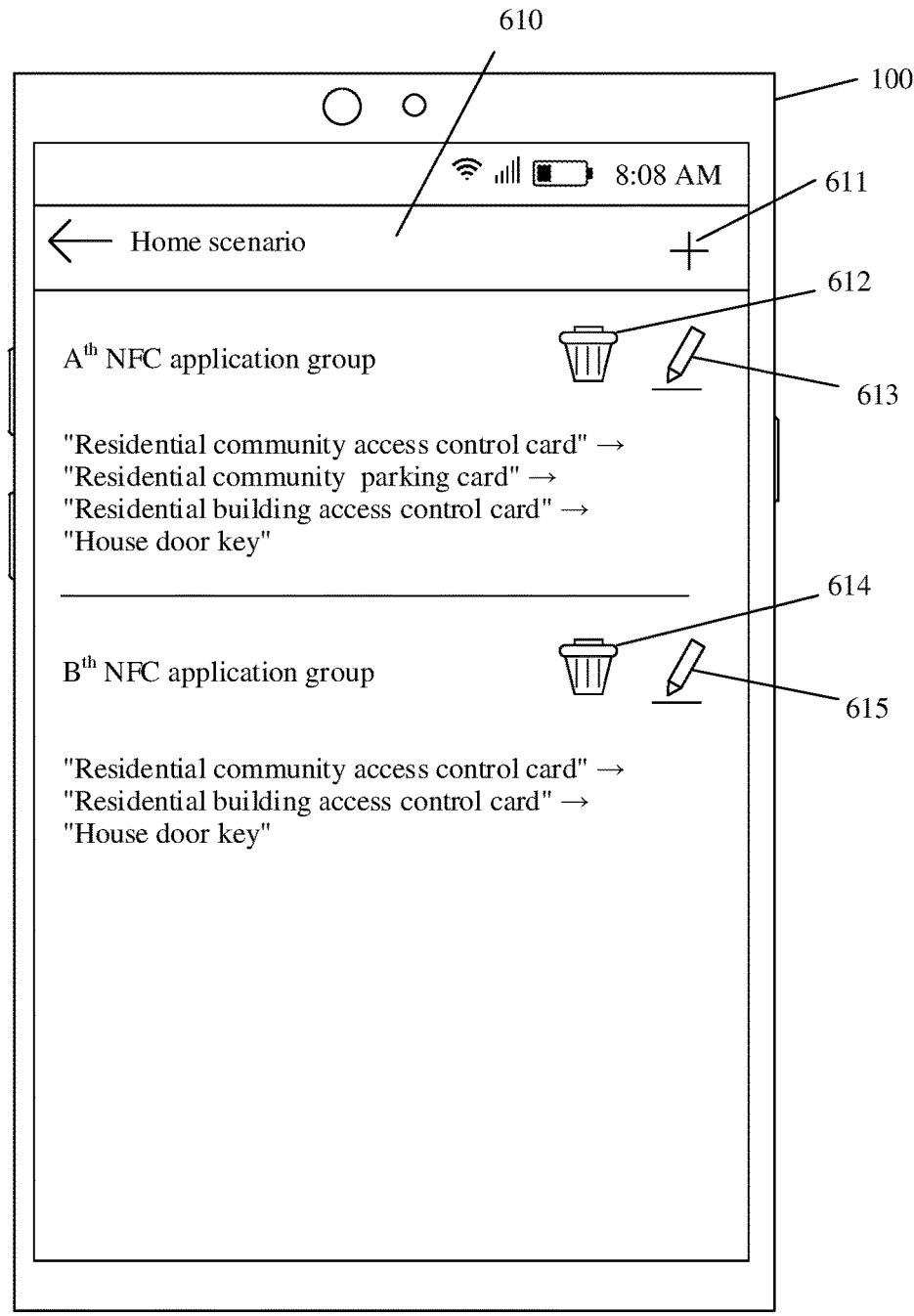

FIG. 6(*a*1), FIG. 6(*a*2), FIG. 6(*b*), and FIG. 6(*c*) are a schematic diagram of examples of entering an NFC interface and entering an interface for modifying an NFC application group. As shown in FIG. 6(*b*), the mobile phone 100 displays an interface 603 shown in FIG. 6(*b*) in response to an operation 602 of selecting "NFC" by the user on a "wireless and network" interface 601 shown in FIG. 6(*a*1).

For another example, the mobile phone 100 may further display the setting interface of the NFC application groups and the scenario information in response to an operation of selecting the "NFC" by the user on a "device connection" interface. The "device connection" interface may be an interface displayed by the mobile phone 100 in response to an operation of selecting "device connection" by the user on the "settings" interface.

As shown in 6(*b*), the mobile phone 100 displays the interface 603 shown in FIG. 6(*b*) in response to an operation 605 of selecting the "NFC" by the user on the "device connection" interface 604 shown in FIG. 6(*a*2).

As shown in FIG. 6(*b*), on/off keys corresponding to a "card reader mode", a "P2P mode", and a "card mode" may be used to enable or disable corresponding NFC functions. A "transportation card" option may be used by the user to bind a bus card, a subway card, or the like. A "payment card" option may be used by the user to associate a bank card, a virtual wallet, or the like. An "access control card" option may be used by the user to add a residential community access control card, a parking card, or the like. An "identity card" option may be used by the user to associate a virtual identity card, a company attendance card, or the like. A "card profile" option may be used by the user to customize and modify scenario information, an NFC application group, and/or the like.

It should be noted that, in this embodiment of this application, that the user customizes and modifies the scenario information and/or the NFC application group includes but is not limited to: The user adds or deletes a scenario category, the user adds or deletes an NFC application group corresponding to a scenario category, the user adds or deletes an NFC application type in an NFC application group, the user adds or deletes an analog card bound to an NFC application, the user modifies a correspondence between a scenario category and an NFC application group, or the user modifies a use order of NFC applications in an NFC application group.

For example, as shown in FIG. 6(*b*), an option 606 may be used by the user to add a scenario category. An option 607 may be used by the user to delete a scenario category. An option 608 may be used by the user to modify a correspondence between a scenario type and an NFC application group, and the like. As shown in FIG. 6(*b*), the mobile phone 100 displays an interface 610 shown in FIG. 6(*c*) in response to an operation 609 of selecting, by the user, a "modify" option corresponding to a home scenario. As shown in FIG. 6(*c*), an option 611 is used by the user to add an NFC application group corresponding to the home scenario. An option 612 may be used by the user to delete an A$^{th}$ NFC application group. An option 613 may be used by the user to add or delete an NFC application type in the A$^{th}$ NFC application group, add or delete an analog card in an NFC application corresponding to the A$^{th}$ NFC application group, modify a use order of NFC applications in the A$^{th}$ NFC application group, or the like. An option 614 may be used by the user to delete a B$^{th}$ NFC application group. An option 615 may be used by the user to add or delete an NFC application type in the B$^{th}$ NFC application group, add or delete an analog card in an NFC application corresponding to the B$^{th}$ NFC application group, modify a use order of NFC applications in the B$^{th}$ NFC application group, or the like.

It should be noted that, in this application, a method for entering an NFC setting interface shown in FIG. 6(*a*1) and in FIG. 6(*a*2), a specific display interface of the NFC setting interface shown in FIG. 6(*b*), and an interface for customizing and modifying an NFC application group shown in FIG. 6(*c*) are merely used as examples. Actually, the user may also enter the NFC setting interface in another manner. In addition, the NFC setting interface and the interface for customizing and modifying an NFC application group may further display another related option, and a display location, a display form, and the like of each option may also have other variations.

Case (2): The plurality of NFC application groups pre-stored in the mobile phone 100 are obtained by the mobile phone 100 by accepting a user-defined setting.

Specifically, the mobile phone 100 may obtain an NFC application group based on a plurality of NFC applications that have different priorities and that are manually set by the user.

For example, the mobile phone 100 may display, in response to an operation of tapping the option 611 on the interface 610 shown in FIG. 6(*c*), an interface for adding an NFC application group, so that the user manually sets a plurality of NFC applications and manually sets priorities of different NFC applications on the interface. The mobile phone 100 may obtain the plurality of NFC application groups based on the foregoing customized settings of the user.

It may be understood that, in the method for invoking the NFC application provided in this application, the electronic device may obtain NFC application groups corresponding to different scenario categories by learning a rule of using NFC applications by the user. Therefore, when the electronic device receives an NFC application invoking request, in combination with one or more of geographical location information, time information, weather information, motion information, or usage information of the electronic device, a requirement of using NFC applications by the user is intelligently predicted based on context awareness, and then an NFC application group that can meet the use requirement of the user and that is corresponding to a use order is predicted, so that the electronic device automatically verifies, one by one, the NFC devices that are approached by the electronic device. This resolves problems of complex operations and low user experience that are caused because the user needs to manually select a to-be-used NFC application, and provides more convenient experience of using the NFC applications for the user.

Figure 7:
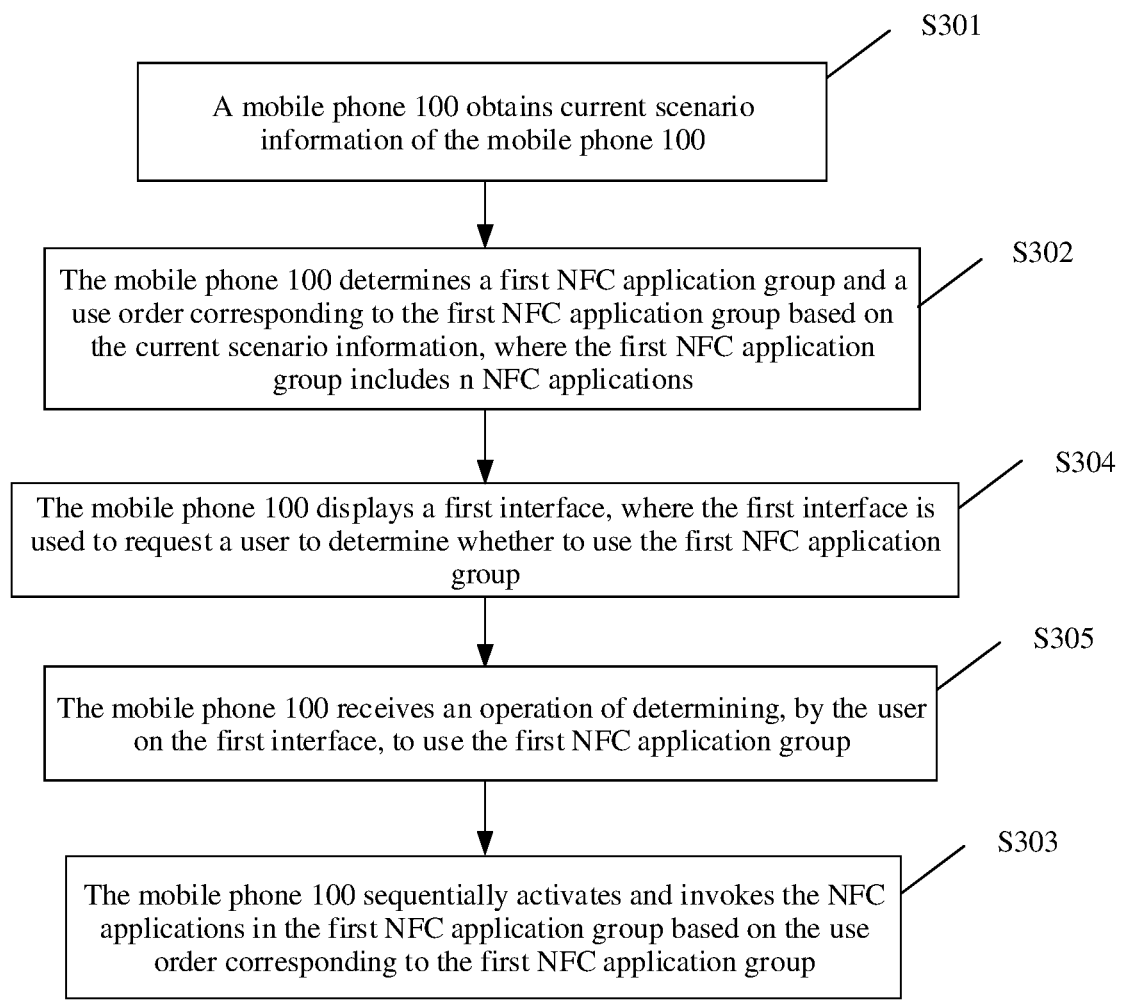
FIG. 7 is a flowchart of another method for invoking an NFC application according to an embodiment of this application.

Optionally, as shown in FIG. 7, after step S302 and before step S303, the method for invoking the NFC application provided in this embodiment of this application may further include steps S304 and S305.

S304: The mobile phone 100 displays a first interface, where the first interface is used to request the user to determine whether to use the first NFC application group.

Specifically, the first interface may be used to indicate first indication information. The first indication information is used to remind the user of the first NFC application group. Further, the first indication information is further used to indicate a use order of the n NFC applications in the first NFC application group, and is used by the user to determine whether to sequentially and automatically activate the n NFC applications based on the use order of the n NFC applications in the first NFC application group, to verify the NFC device that is approached by the mobile phone 100.

Figure 8A:
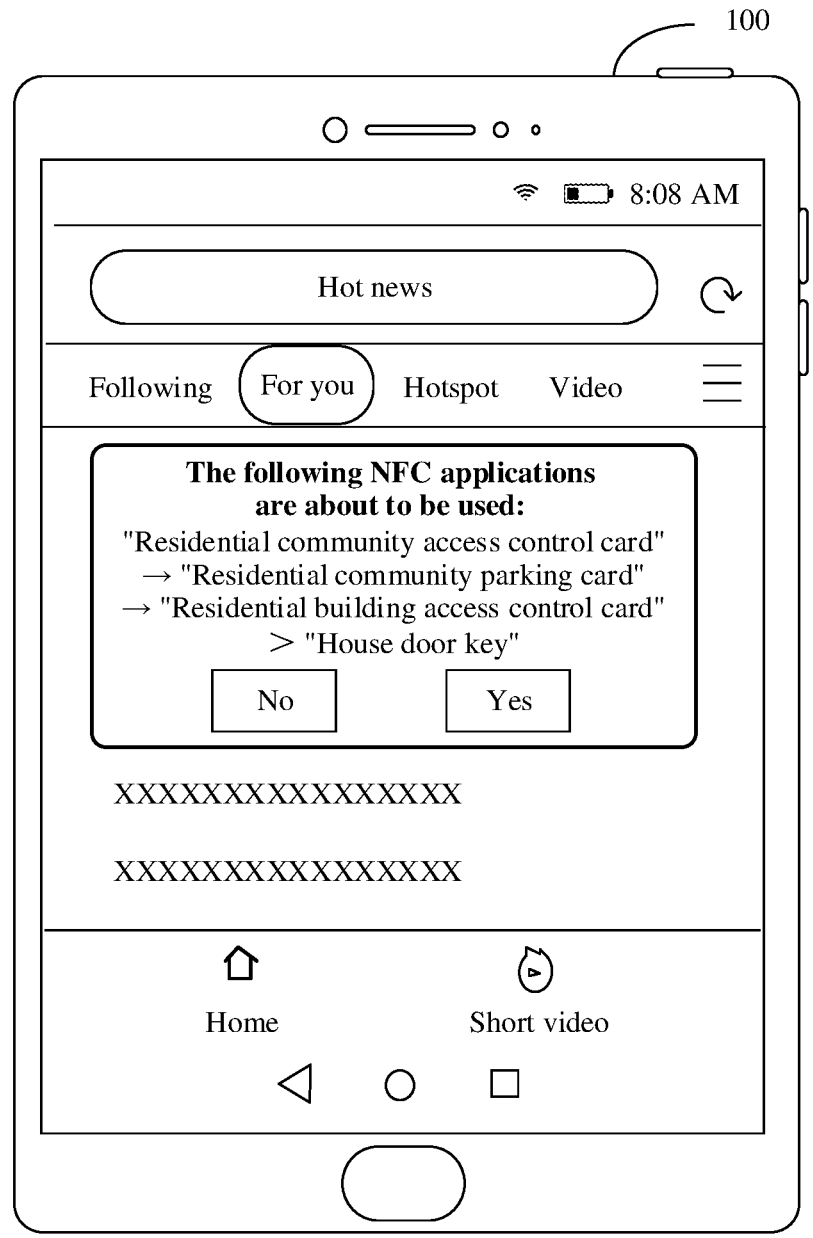
FIG. 8(a) to FIG. 8(c) are a schematic diagram of examples of two display forms of first indication information according to an embodiment of this application.
Figure 8B:
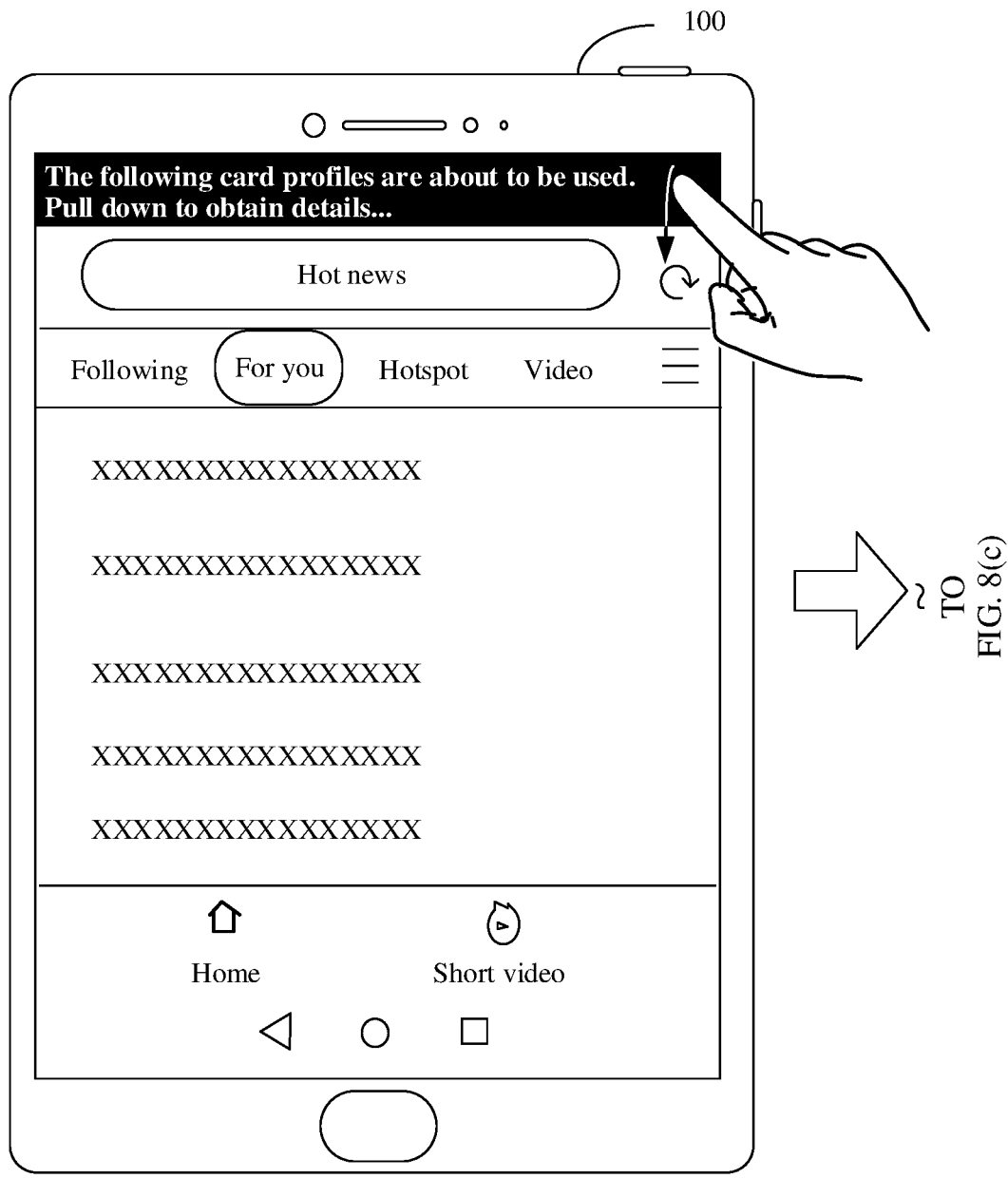

The first indication information may be displayed in a pop-up window on the first interface, as shown in FIG. 8(a). Alternatively, to avoid interrupting an interface that is being operated by the user and improve user experience, the first indication information may be displayed on the first interface in a pull-down notification form, as shown in FIG. 8(b). Alternatively, the first indication information may be displayed on the first interface in a suspend box form.

Figure 8C:
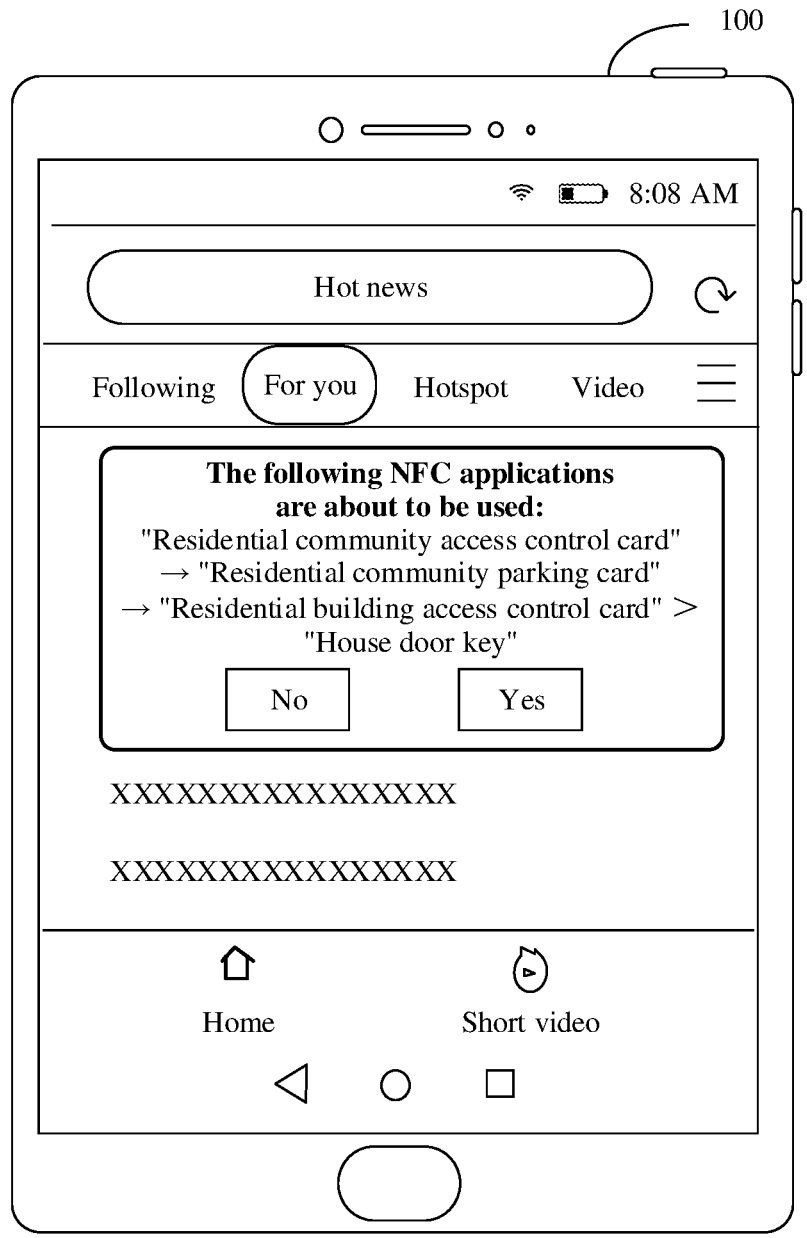

For example, as shown in FIG. 8(b), the mobile phone 100 displays an interface shown in FIG. 8(c) in response to an operation of pulling down a notification bar used to notify the first indication information by the user.

It should be noted that in FIG. 8(a) and in FIG. 8(b) in this application are merely used as examples of two display forms of the first indication information. A specific display form and specific displayed information content of the first indication information are not limited in this embodiment of this application.

S305: The mobile phone 100 receives an operation of determining, by the user on the first interface, to use the first NFC application group.

For example, the operation of determining, by the user on the first interface, to use the first NFC application group may be an operation of tapping, by the user, an option "OK" in the interface shown in FIG. 8(a) or in FIG. 8(c).

When the mobile phone 100 performs step S304, step S303 includes: In response to the operation of determining, by the user, to use the first NFC application group on the first interface, the mobile phone 100 sequentially activates and invokes the NFC applications in the first NFC application group based on the use order corresponding to the first NFC application group.

For example, as shown in FIG. 8(b), in response to the operation of tapping, by the user, the option "OK" on the interface shown in FIG. 8(c), or in response to the operation of tapping, by the user, the option "OK" on the interface shown in FIG. 8(a), the mobile phone 100 sequentially and automatically activates the n NFC applications based on a use order of at least n NFC applications in the first group of NFC applications, to verify the NFC device that is approached by the mobile phone 100.

It may be understood that the NFC application group indicated by the first indication information corresponds to a plurality of NFC applications that are predicted by the mobile phone 100 based on the current scenario information obtained by the mobile phone 100 and that may need to be used by the user subsequently. The mobile phone 100 reminds the user of the plurality of NFC applications that are to be used and an adaptive order of the plurality of NFC applications, so that the user can feed back a prediction result of the mobile phone 100, and the mobile phone 100 can accurately verify the NFC device that is approached by the mobile phone 100.

Optionally, in this embodiment of this application, if the mobile phone 100 invokes an NFC application that is associated with a bank card or a virtual wallet of the user, such as the "payment card" application or the "transportation card" application, the mobile phone 100 may further remind the user of a deduction status of current card swiping after invoking the NFC application such as the "payment card" application or the "transportation card" application. For example, the mobile phone 100 may remind the user in a drop-down notification bar, or may remind the user in a pop-up window.

It may be understood that, in the method for invoking the NFC application provided in this application, the electronic device reminds the user of the plurality of NFC applications that are predicted by the electronic device and that are to be invoked and the use order of the NFC applications, and provides an option used by the user to feed back accuracy of the prediction result. This improves accuracy of a response of the electronic device to the received NFC application invoking request, and provides more convenient experience of using the NFC applications for the user.

It should be understood that the solutions in embodiments of this application may be properly combined for use, and explanations or descriptions of terms in embodiments may be cross-referenced or explained in embodiments. This is not limited.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

It may be understood that, to implement functions of any one of the foregoing embodiments, the electronic device includes a corresponding hardware structure and/or software module for performing each function. A person skilled in the art should be easily aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the electronic device may be divided into functional modules. For example, each functional module corresponding to each function may be obtained through division, or two or more functions may be integrated into one processing module. The integrated module may be implemented in a form of hardware, or may be implemented in a form of a software functional module. It should be noted that, in embodiments of this application, division into modules is an example, and is merely a logical function division. In actual implementation, another division manner may be used.

Figure 9:
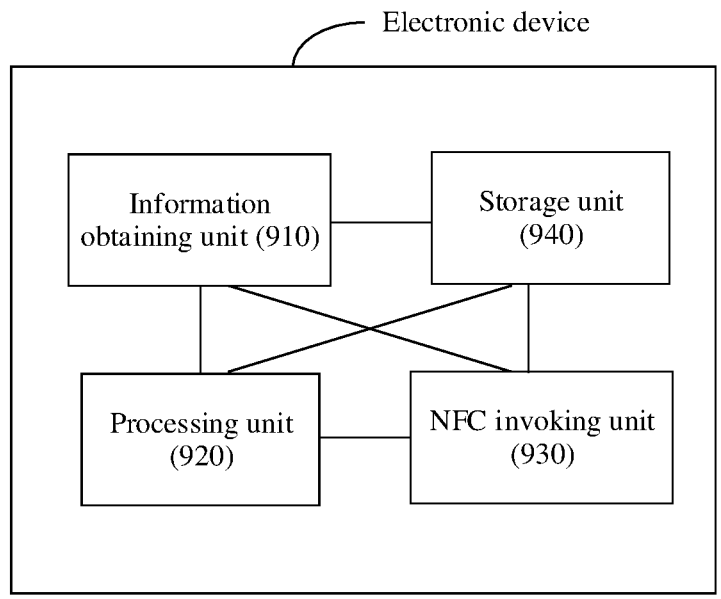
FIG. 9 is a block diagram of a structure of an electronic device according to an embodiment of this application.

For example, when each functional module is obtained through division in an integrated manner, FIG. 9 is a block diagram of a structure of an electronic device according to an embodiment of this application. The electronic device may include an information obtaining unit 910, a processing unit 920, and an NFC invoking unit 930.

The information obtaining unit 910 is configured to support the electronic device in performing the foregoing step S301, and/or is configured to perform another process of the technology described in this specification. The processing unit 920 is configured to support the electronic device in performing the foregoing step S302, and/or is configured to perform another process of the technology described in this specification. The NFC invoking unit 930 is configured to support the electronic device in performing the foregoing step S303, S501, S502, S503-1, S503-2, S504, S503-3, or S503-4, and/or is configured to perform another process of the technology described in this specification.

Further, as shown in FIG. 9, the electronic device may further include a storage unit 940, configured to pre-store a plurality of NFC application groups, and/or configured to store other information of the technology described in this specification.

Figure 10:
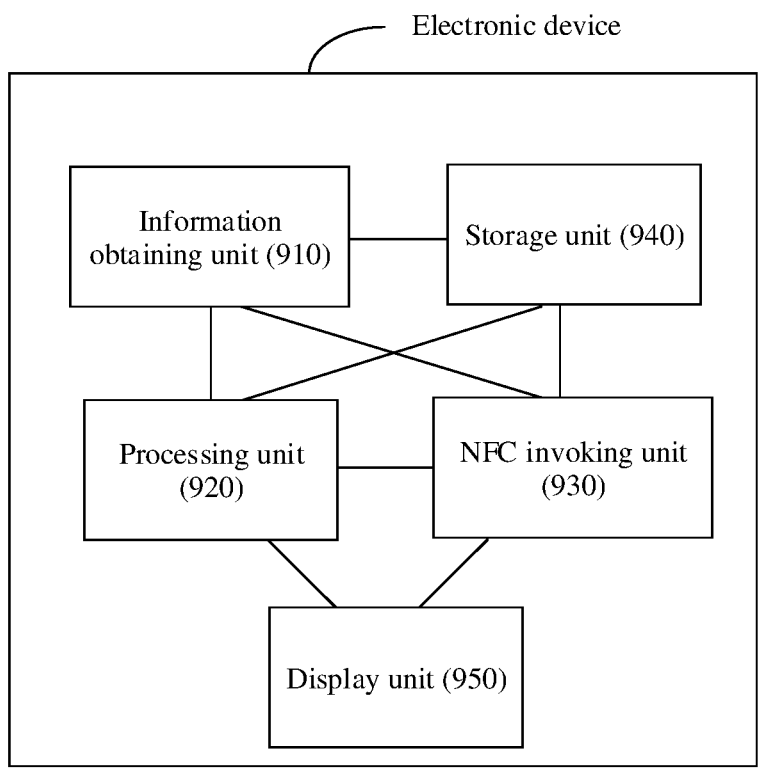
FIG. 10 is a block diagram of another structure of an electronic device according to an embodiment of this application.

In a possible structure, as shown in FIG. 10, the electronic device may further include a display unit 950, configured to support the electronic device in performing the foregoing step S304 or S305, or display a second interface, and/or display other information used for the technology described in this specification.

It should be noted that the electronic device may further include a radio frequency circuit. Specifically, the electronic device may receive and send radio signals through the radio frequency circuit. The radio frequency circuit usually includes but is not limited to an antenna, at least one amplifier, a transceiver, a coupler, a low noise amplifier, a duplexer, and the like. In addition, the radio frequency circuit may further communicate with another device through wireless communication. The wireless communication may use any communication standard or protocol, including but not limited to a global system for mobile communications, a general packet radio service, code division multiple access, wideband code division multiple access, long term evolution, an email, a short message service, and the like.

It should be understood that the electronic device according to this embodiment of this application may correspond to the method in the foregoing method embodiments, for example, the method in FIG. 3, FIG. 5A, or FIG. 5B, and the foregoing and other management operations and/or functions of the modules in the electronic device are separately used to implement corresponding steps of the method in the foregoing method embodiments. Therefore, beneficial effects in the foregoing method embodiments may also be implemented. For brevity, details are not described herein again.

It should be further understood that each module in the electronic device may be implemented in a form of software and/or hardware. This is not specifically limited herein. In other words, the electronic device is presented in a form of a functional module. The "module" herein may be an application-specific integrated circuit ASIC, a circuit, a processor and a memory that execute one or more software or firmware programs, an integrated logic circuit, and/or another component that can provide the foregoing functions.

In an optional manner, when software is used to implement data transmission, the data transmission may be implemented totally or partially in a form of a computer program product. The computer program product includes one or more computer instructions. When the computer program instructions are loaded and executed on a computer, the procedure or functions according to embodiments of this application are all or partially implemented. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

Method or algorithm steps described in combination with embodiments of this application may be implemented by hardware, or may be implemented by a processor by executing software instructions. The software instructions may include a corresponding software module. The software module may be stored in a RAM memory, a flash memory, a ROM memory, an EPROM memory, an EEPROM memory, a register, a hard disk, a removable hard disk, a CD-ROM memory, or a storage medium in any other form well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a detection apparatus. Certainly, the processor and the storage medium may alternatively exist in the detection apparatus as discrete components.

Based on the foregoing descriptions of the implementations, a person skilled in the art may clearly understand that for the purpose of convenient and brief descriptions, division into the foregoing functional modules is merely used as an example for descriptions. In actual application, the foregoing functions can be allocated to different functional modules for implementation based on a requirement, in other words, an inner structure of an apparatus is divided into different functional modules to implement all or a part of the functions described above.

In an optional manner, this application provides a chip system. The chip system includes a processor and a memory. The memory stores instructions. When the instructions are executed by the processor, the method for invoking the NFC application in any one of the possible implementations provided in this application is implemented. The chip system may include a chip, or may include a chip and another discrete component.

In the several embodiments provided in this application, it should be understood that the disclosed user equipment and method may be implemented in other manners. For example, the described apparatus embodiments are merely examples. For example, division into the modules or units is merely logical function division. In actual implementation, there may be another division manner. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, in other words, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for enabling a device (which may be a single-chip microcomputer, a chip or the like) or a processor (processor) to perform all or some of the steps of the method described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are only specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method applied to an electronic device, wherein the electronic device comprises a plurality of near field communication (NFC) applications, and the method comprises:

obtaining, by the electronic device as the electronic device approaches a first NFC device of a plurality of NFC devices, current scenario information of the electronic device, wherein the current scenario information comprises one or more of geographical location information, time information, weather information, motion information, or usage information, the motion information indicates a motion status of the electronic device, the geographical location information is determined by the electronic device and indicates a geographical location of the electronic device, and the usage information indicates information about the electronic device using NFC applications within a preset time range prior to a time indicated by the time information;

predicting, by the electronic device based on an analysis of the current scenario information performed by the electronic device, a first NFC application group to be invoked and a use order corresponding to the first NFC application group, wherein the first NFC application group comprises n NFC applications of the plurality of NFC applications, n≥2, and n is a positive integer, the use order indicates an order of the n NFC applications in the first NFC application group, and each one of the n NFC applications corresponds to a different one of the plurality of NFC devices; and sequentially invoking, by the electronic device, the n NFC applications in the first NFC application group based on the use order corresponding to the first NFC application group, wherein each of the plurality of NFC applications has an emulation function of emulating a non-contact integrated circuit (IC) card.

2. The method according to claim 1, wherein sequentially invoking, by the electronic device, the n NFC applications in the first NFC application group based on the use order corresponding to the first NFC application group comprises:

activating, by the electronic device, an $i^{th}$ NFC application in the first NFC application group, wherein i is a positive integer, and i<n;

verifying, by the electronic device, the $i^{th}$ NFC application when approaching an NFC device, of the plurality of NFC devices, corresponding to the $i^{th}$ NFC application; and activating, by the electronic device, an $(i+1)^{th}$ NFC application after verification of the $i^{th}$ NFC application succeeds.

3. The method according to claim 2, wherein the $i^{th}$ NFC application is an $i^{th}$ invoked NFC application in the first NFC application group in a usage scenario corresponding to usage scenario information of the first NFC application group, and the $(i+1)^{th}$ NFC application is an $(i+1)^{th}$ invoked NFC application in the first NFC application group in the usage scenario corresponding to the usage scenario information of the first NFC application group, wherein the usage scenario information matches the current scenario information, and the usage scenario information comprises one or more of geographical location information, time information, weather information, motion information, or operation information of the electronic device when the n NFC applications in the first NFC application group are invoked.

4. The method according to claim 2, wherein when the verifying of the $i^{th}$ NFC application fails, the method further comprises:

sequentially activating, by the electronic device, other NFC applications other than the $i^{th}$ NFC application in the first NFC application group until verification of a NFC application in the first NFC application group succeeds.

5. The method according to claim 4, wherein the method further comprises:

in a process in which the electronic device sequentially activates the other NFC applications other than the $i^{th}$ NFC application in the first NFC application group, recording, by the electronic device, usage scenario information when the electronic device uses NFC applications;

updating, by the electronic device based on the usage scenario information recorded by the electronic device when the electronic device uses the NFC applications, a rule of using the NFC applications by a user; and updating, by the electronic device based on an updated rule of using the NFC applications by the user, an NFC application group that matches the current scenario information.

6. The method according to claim 4, wherein after sequentially activating, by the electronic device, the other NFC applications other than the $i^{th}$ NFC application in the first NFC application group until the verification of the NFC application succeeds, the method further comprises:

sequentially activating and invoking, by the electronic device, NFC applications in a second NFC application group based on a use order corresponding to the second NFC application group, wherein the second NFC application group is different from the first NFC application group, and corresponds to usage scenario information that has highest matching degree with the current scenario information among a plurality of NFC application groups comprising the first NFC application group and the second NFC application group; or displaying, by the electronic device, a second interface, through which a to-be-switched NFC application group in the plurality of NFC application groups is selected by a user; and in response to an operation of selecting a third NFC application group by the user on the second interface, sequentially activating and invoking, by the electronic device, NFC applications in the third NFC application group based on a use order corresponding to the third NFC application group.

7. The method according to claim 1, wherein before sequentially invoking, by the electronic device, the n NFC applications in the first NFC application group based on the use order corresponding to the first NFC application group, the method further comprises:

displaying, by the electronic device, a first interface, through which a user determines whether to use the first NFC application group; and receiving, by the electronic device, an operation of determining, by the user on the first interface, to use the first NFC application group; and wherein sequentially invoking, by the electronic device, the n NFC applications in the first NFC application group based on the use order corresponding to the first NFC application group comprises:

in response to the operation of determining, by the user on the first interface, to use the first NFC application group, sequentially activating and invoking, by the electronic device, the n NFC applications in the first NFC application group based on the use order corresponding to the first NFC application group.

8. The method according to claim 7, wherein the first interface comprises information that reminds the user of the use order of the n NFC applications in the first NFC application group.

9. The method according to claim 1, wherein the electronic device pre-stores a plurality of NFC application groups, and each NFC application group comprises NFC applications; and predicting, by the electronic device based on the analysis of the current scenario information performed by the electronic device, the first NFC application group comprises:

predicting, by the electronic device based on the analysis of the current scenario information performed by the electronic device, the first NFC application group from the plurality of NFC application groups pre-stored in the electronic device, with the first NFC application group corresponding to usage scenario information that has highest matching degree with the current scenario information among the plurality of NFC application groups.

10. The method according to claim 9, wherein the method further comprises:

obtaining, by the electronic device based on usage scenario information about the electronic device using NFC applications within a preset time range, a rule of using the NFC applications by a user;

determining, by the electronic device, the plurality of NFC application groups based on the rule of using the NFC applications by the user, and pre-storing, by the electronic device, the plurality of NFC application groups in the electronic device; or receiving, by the electronic device, a plurality of user-defined NFC application groups, and pre-storing the plurality of user-defined NFC application groups in the electronic device.

11. The method according to claim 1, wherein the use order corresponding to the first NFC application group comprises a priority order, a geographical order, or a use time order of the n NFC applications in the first NFC application group.

12. A non-transitory computer-readable storage medium storing computer-executable instructions, wherein when the computer-executable instructions are executed by one or more processors, the one or more processors are configured to perform the method according to claim 1.

13. A chip system, wherein the chip system comprises one or more processors and a non-transitory storage medium, the storage medium stores instructions, and when the instructions are executed by the one or more processors, the one or more processors are configured to perform the method according to claim 1.

14. A computer program product, wherein the computer program product comprises program instructions, and when the program instructions are executed by one or more processors, the one or more processors are configured to perform the method according to claim 1.

15. An electronic device, wherein the electronic device comprises a plurality of near field communication (NFC) applications, and the electronic device further comprises:

a non-transitory memory storage comprising instructions; and one or more processors in communication with the memory storage, wherein the one or more processors execute the instructions to:

obtain, as the electronic device approaches a first NFC device of a plurality of NFC devices, current scenario information of the electronic device, wherein the current scenario information comprises one or more of geographical location information, time information, weather information, motion information, or usage information, the motion information indicates a motion status of the electronic device, the geographical location information determined by the electronic device and indicates a geographical location of the electronic device, and the usage information indicates information about the electronic device using NFC applications within a preset time range prior to a time indicated by the time information;

predict, based on an analysis of the current scenario information performed by the electronic device, a first NFC application group to be invoked and a use order corresponding to the first NFC application group, wherein the first NFC application group comprises n NFC applications of the plurality of NFC applications, n≥2, and n is a positive integer, the use order indicates an order of the n NFC applications, and each one of the n NFC applications corresponds to a different one of the plurality of NFC devices; and sequentially invoke the n NFC applications in the first NFC application group based on the use order corresponding to the first NFC application group, wherein each of the plurality of NFC applications has an emulation function of emulating a non-contact integrated circuit (IC) card.

16. The electronic device according to claim 15, wherein sequentially invoking the NFC applications in the first NFC application group comprises:

activating an $i^{th}$ NFC application in the first NFC application group, wherein i is a positive integer, and i<n;

verifying the $i^{th}$ NFC application when the electronic device approaches an NFC device, of the plurality of NFC devices, corresponding to the $i^{th}$ NFC application; and activating an $(i+1)^{th}$ NFC application after verification of the $i^{th}$ NFC application succeeds.

17. The electronic device according to claim 16, wherein the $i^{th}$ NFC application is an $i^{th}$ invoked NFC application in the first NFC application group in a usage scenario corresponding to usage scenario information of the first NFC application group, and the $(i+1)^{th}$ NFC application is an $(i+1)^{th}$ invoked NFC application in the first NFC application group in the usage scenario corresponding to the usage scenario information of the first NFC application group, wherein the usage scenario information matches the current scenario information, and the usage scenario information comprises one or more of geographical location information, time information, weather information, motion information, or operation information of the electronic device when the n NFC applications in the first NFC application group are invoked.

18. The electronic device according to claim 15, wherein the one or more processors are further configured to:

display a first interface, through which a user determines whether to use the first NFC application group; and receive an operation of determining, by the user on the first interface, to use the first NFC application group, and wherein sequentially invoking the n NFC applications in the first NFC application group based on the use order corresponding to the first NFC application group comprises:

in response to the operation of determining, by the user on the first interface, to use the first NFC application group, sequentially activating and invoking the n NFC applications in the first NFC application group based on the use order corresponding to the first NFC application group.

19. The electronic device according to claim 18, wherein the first interface comprises information that reminds the user of the use order of the n NFC applications in the first NFC application group.

20. The electronic device according to claim 15, wherein the electronic device pre-stores a plurality of NFC application groups, and each NFC application group comprises NFC applications; and predicting, based on the analysis of the current scenario information performed by the electronic device, the first NFC application group and the use order corresponding to the first NFC application group comprises:

predicting, based on the analysis of the current scenario information performed by the electronic device, the first NFC application group from the plurality of NFC application groups pre-stored, with the first NFC application group corresponding to usage scenario information that has highest matching degree with the current scenario information among the plurality of NFC application groups.

* * * * *